US011875324B1

(12) United States Patent
Jain et al.

(10) Patent No.: US 11,875,324 B1
(45) Date of Patent: Jan. 16, 2024

(54) INTERCONNECTED VISUAL ANIMATIONS FOR INTERRELATED OBJECTS

(71) Applicant: Emoji ID, LLC, Oakland, CA (US)

(72) Inventors: Naveen Kumar Jain, Nashville, TN (US); Riccardo Paolo Spagni, Plettenburg (ZA)

(73) Assignee: EMOJI ID, LLC, Oakland, CA (US)

( * ) Notice: Subject to any disclaimer, the term of this patent is extended or adjusted under 35 U.S.C. 154(b) by 0 days.

(21) Appl. No.: 18/067,529

(22) Filed: Dec. 16, 2022

(51) Int. Cl.
| | |
|---|---|
| *G06Q 20/12* | (2012.01) |
| *H04L 9/00* | (2022.01) |
| *G06Q 20/36* | (2012.01) |
| *H04L 9/32* | (2006.01) |
| *G06T 13/80* | (2011.01) |

(52) U.S. Cl.
CPC ........... *G06Q 20/123* (2013.01); *G06Q 20/36* (2013.01); *G06T 13/80* (2013.01); *H04L 9/3239* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 11,501,297 B1 * | 11/2022 | Tai .......................... | G06Q 20/02 |
| 11,552,799 B1 * | 1/2023 | Parikh ................. | G06F 16/2365 |
| 2012/0303548 A1 * | 11/2012 | Johnson ................ | G06F 3/0412 |
| | | | 715/810 |
| 2015/0161732 A1 * | 6/2015 | Lachance ............... | G06Q 40/06 |
| | | | 705/36 R |
| 2021/0312676 A1 * | 10/2021 | Sun ....................... | G06T 11/206 |
| 2022/0358186 A1 * | 11/2022 | Deuel ....................... | H04L 9/50 |
| 2022/0384027 A1 * | 12/2022 | Kaleal, III ............... | A61B 5/11 |

* cited by examiner

*Primary Examiner* — Jeffrey J Chow
(74) *Attorney, Agent, or Firm* — Perkins Coie LLP; Colin Fowler

(57) ABSTRACT

Disclosed concepts relate to presenting interconnected animations in an object display interface that indicate dynamic events for related objects. A platform presents an interface that includes tiles for objects that belong to object sets (e.g., a non-fungible token (NFT) collection, a set of numbered items, a limited sneaker line). Each tile includes information individually specific to a corresponding object. A platform monitors for event data that results in a change to an aggregate parameter (e.g., a floor price, an event rate) for a given object set or that specifies one or more individual events for objects belonging to the given object set. Based on detecting the event data, the platform dynamically presents animations on certain tiles corresponding to objects of the given object set, and the animations indicate the change to the aggregate parameter or indicate the individual events. Contextual and multi-level information is thus conveyed without significant visual clutter.

19 Claims, 26 Drawing Sheets

US 11,875,324 B1

INTERCONNECTED VISUAL ANIMATIONS FOR INTERRELATED OBJECTS

TECHNICAL FIELD

The disclosure relates to display interfaces for visually conveying information. The disclosure relates in some specific embodiments to conveying information related to digital cryptographic objects managed on a distributed immutable cryptographic ledger, for example, a blockchain.

BACKGROUND

A growing number of unique cryptographic objects exists, and each cryptographic object can be involved in exchanges between users. A large volume of information related to individual cryptographic objects can exist, and users need information to make informed decisions related to the exchange and management of cryptographic objects.

DETAILED DESCRIPTION

Cryptographic Platforms

Figure 1:
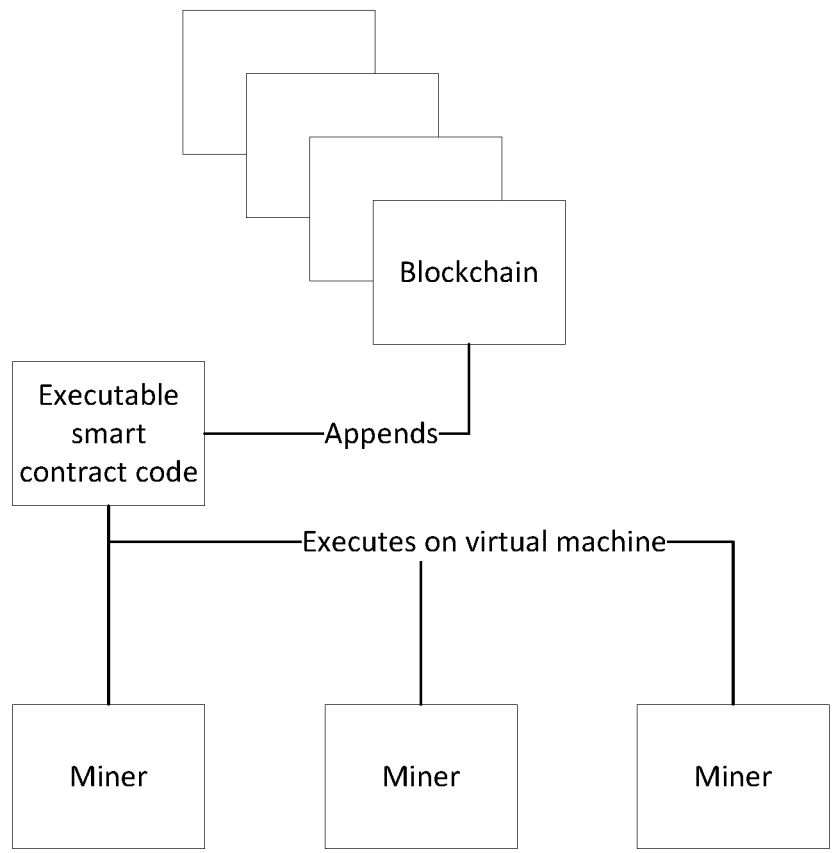
FIG. 1 is a block diagram illustrating a data structure of a smart contract.

Public and private keys are an integral component of cryptocurrencies built on blockchain networks and are part of a larger field of cryptography known as public-key cryptography (PKC) or asymmetric encryption. The goal of PKC is to easily transition from a first state (e.g., a private key) to a second state (e.g., a public key) while reversing the transition from the second state to the first state nearly impossible, and in the process, proving possession of a secret key without exposing that secret key. The product is subsequently a one-way mathematical function, which makes it ideal for validating the authenticity of transactions such as cryptocurrency transactions because possession of the first state such as the secret key cannot be forged. PKC relies on a two-key model, the public and private key.

The general purpose of PKC is to enable secure, private communication using digital signatures in a public channel that is susceptible to potentially malicious eavesdroppers. In the context of cryptographic tokens, the goal is to prove that a traded token was indeed signed by the owner of that token, and was not forged, all occurring over a public blockchain network between peers. A private key of a blockchain wallet unlocks the right for the blockchain wallet's owner to spend transfer tokens in the blockchain wallet and therefore must remain private. A wallet address of the blockchain wallet is cryptographically linked to the blockchain wallet's private key and is publicly available to all users to enable other users to send NFTs to the user's blockchain wallet. For example, the wallet address may be a public key generated from the blockchain wallet's private key using one or more PKC algorithms. Public keys are generally used to identify wallets, whereas the private keys are used to authorize actions of the respective wallet.

Wallet addresses for blockchain wallets are typically represented in human-legible form in one of three ways: as a hexadecimal representation, as a Base64 representation, or as a Base58 representation. In each of these common ways of representing the wallet addresses, each wallet address is represented using a string of letters and numbers, typically exceeding 20 characters in length. The length and randomness of the alphanumeric string makes the wallet address unwieldy and difficult to remember, thereby decreasing its usability and hindering the adoption of cryptocurrencies.

Structurally, in some embodiments, customized, flexible cryptographic tokens connected to a smart contract are powered by a less flexible, base cryptocurrency. Miners operating on the network for the base cryptocurrency power execution of a distributed application (dApp) or smart contract. The smart contract is held by an administrative user and includes all of the custom cryptographic tokens. The custom cryptographic tokens do not "move" in the same sense that the base cryptocurrency moves via transactions. The smart contract is "held" by the administrative user though secondary users may interact with the smart contract and various portions (specific tokens) may be attributed to those secondary users.

FIG. 1 is a block diagram illustrating a data structure of a smart contract. Smart contracts and dApps execute on an Ethereum virtual machine ("EVM"). The EVM is instantiated on available network nodes. Smart contracts and dApps are applications that execute; thus, the processing power to do so must come from hardware somewhere. Nodes must volunteer their processors to execute these operations based on the premise of being paid for the work in Ethereum coins, referred to as Ether, measured in "gas." Gas is the name for a unit of work in the EVM. The price of gas can vary, often because the price of Ether varies, and is specified within the smart contract/dApp.

Every operation that can be performed by a transaction or contract on the Ethereum platform costs a certain number of gas, with operations that require more computational resources costing more gas than operations that require few computational resources. For example, at the time of writing, a multiplication instruction requires five gas, whereas an addition instruction requires three gas. Conversely, more complex instructions, such as a Keccak256 cryptographic hash requires 30 initial gas and six additional gas for every 326 bits of data hashed.

The purpose of gas is pay for the processing power of the network on execution of smart contracts at a reasonably steady rate. That there is a cost at all ensures that the work/processing being performed is useful and valuable to someone. Thus, the Ethereum strategy differs from a Bitcoin transaction fee, which is only dependent on the size in kilobytes of a transaction. As a result that Ethereum's gas costs are rooted in computations, even a short segment of code can result in a significant amount of processing performed. The use of gas further enforces incentivizes coders to generate efficient smart contracts/algorithms. Otherwise, the cost of execution may spiral out of control. Unrestricted, an exponential function may bankrupt a given user.

While operations in the EVM have a gas cost, gas has a "gas price" measured in ether. Transactions specify a given gas price in ether for each unit of gas. The fixing of price by transaction enables the market to decide the relationship between the price of ether and the cost of computing operations (as measured in gas). The total fee paid by a transaction is the gas used multiplied by gas price.

If a given transaction offers very little in terms of a gas price, that transaction will have low priority on the network. In some cases, the network miners may place a threshold on the gas price each is willing to execute/process for. If a given transaction is below that threshold for all miners, the process will never execute. Where a transaction does not include enough ether attached (e.g., because the transaction results in so much computational work that the gas costs exceed the attached ether) the used gas is still provided to the miners. When the gas runs out, the miner will stop processing the transaction, revert changes made, and append to the blockchain with a "failed transaction." Failed transactions may occur because the miners do not directly evaluate smart contracts for efficiency. Miners will merely execute code with an appropriate gas price attached. Whether the code executes to completion or stalls out due to excessive computational complexity is of no matter to the miner.

Where a high gas price is attached to a transaction, the transaction will be given priority. Miners will process transactions in order of economic value. Priority on the Ethereum blockchain works similarly as with the Bitcoin blockchain. Where a user attaches more ether to a given transaction than necessary, the excess amount is refunded back to that user after the transaction is executed/processed. Miners only charge for the work that is performed. A useful analogy regarding gas costs and price is that the gas price is similar to an hourly wage for the miner, whereas the gas cost is like a timesheet of work performed.

A type of smart contract that exists on the Ethereum blockchain are ERC-20 tokens (Ethereum Request for Comment-20). ERC-20 is a technical specification for fungible utility tokens. ERC-20 defines a common list of rules for Ethereum tokens to follow within the larger Ethereum ecosystem, allowing developers to accurately predict interaction between tokens. These rules include how the tokens are transferred between addresses and how data within each token is accessed. ERC-20 provides a framework for a means to build a token on top of a base cryptocurrency. In some embodiments herein, enhancements are built on top of the ERC-20 framework, though use of the ERC-20 technical specification is not inherently necessary and is applicable to circumstances where Ethereum is used as the base cryptocurrency.

Another type of smart contract that exists on the Ethereum blockchain are ERC-721 tokens (Ethereum Request for Comment-721). ERC-721 is a technical specification for NFTs. The ERC-721 introduces a standard for NFT. An ERC-721 token is unique and can have different exclusivity to another token from the same smart contract, maybe due to age, rarity or visuals.

NFTs have a uint256 variable called tokenId. Thus, for any ERC-721 contract, the pair contract address, uint256 tokenId must be globally unique. That said, a given dApp can have a "converter" that uses the tokenId as input and outputs an image.

Disclosure on token protocols has focused on Ethereum. As applicable in this disclosure, Ethereum is a base cryptocurrency. Other base cryptocurrencies exist now and in the future. This disclosure is not limited to application on specifically the Bitcoin or Ethereum blockchains.

Figure 2:
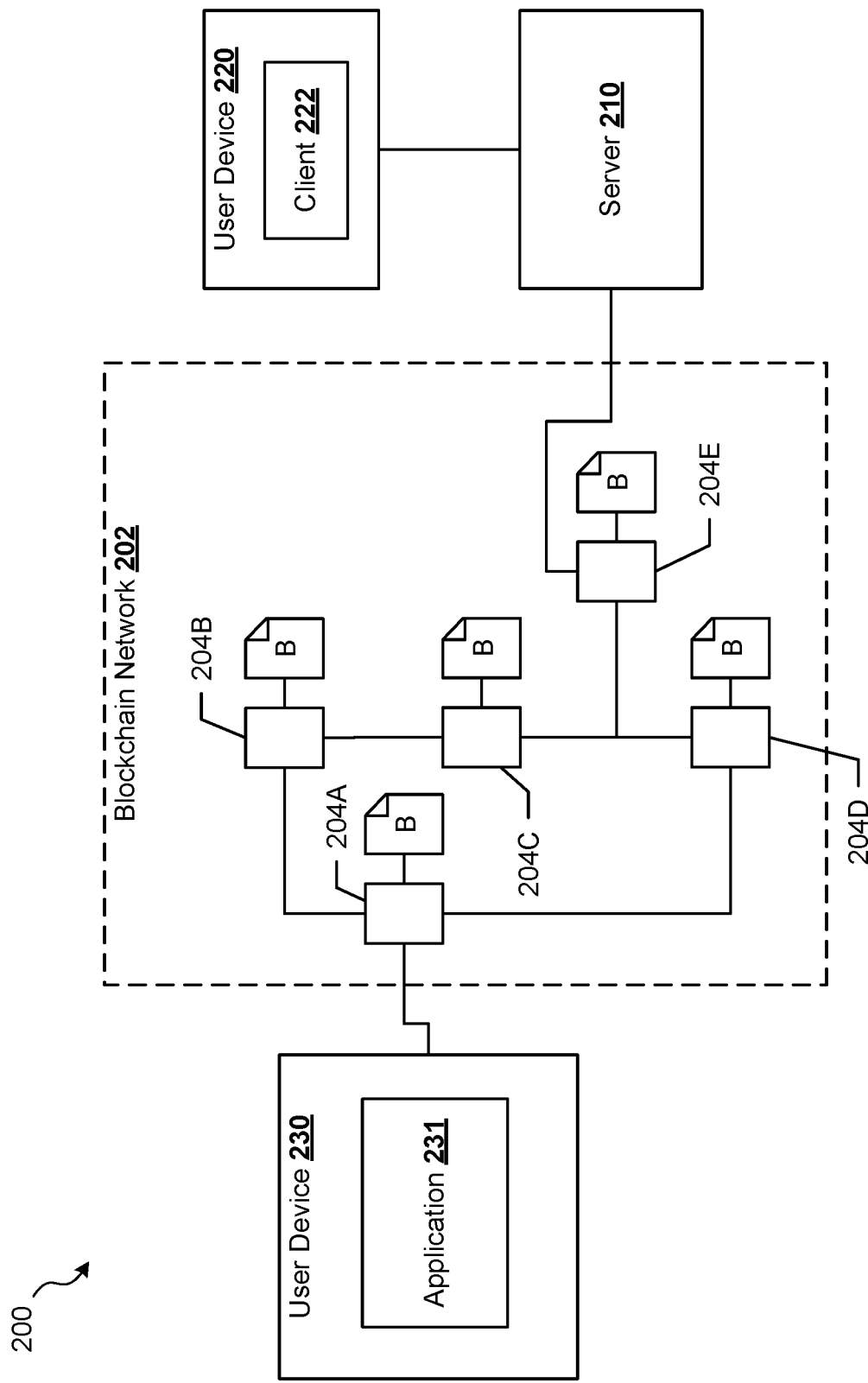
FIG. 2 illustrates a block diagram of a system that includes a distributed immutable cryptographic ledger for cryptographic objects.

FIG. 2 illustrates a block diagram of a system 200 that includes a blockchain network 202, user device 220, user device 230, and server 210. As shown in FIG. 2, blockchain network 202 includes a plurality of nodes 204A-E (e.g., servers) that each maintain respective copies of a blockchain. In actual practice, blockchain network 202 may include hundreds or thousands of nodes. In some embodiments, blockchain network 202 may be a distributed peer-to-peer network as is known by those skilled in the art. In some embodiments, blockchain network 202 of nodes 204A-E implement consensus algorithms to validate transactions submitted to blockchain network 202. A verified transaction may include transferred cryptocurrency, contracts, records, or other information to be recorded to the blockchain. In some embodiments, multiple transactions are combined together into a block of data that is verified across blockchain network 202. Once verified, this block of data can be added to an existing blockchain maintained by each of nodes 204A-E.

In some embodiments, a user can initiate transactions to be submitted to blockchain network 202 using user device 230. For example, the user may submit a transaction using application 231 configured to interact with blockchain network 202. For example, application 231 may generate and transmit cryptocurrency transactions to node 204A for validation and verification. Application 231 may include software downloaded from a digital distribution platform (e.g., App Store on Apple devices or Microsoft Store on Windows devices) or a content server. In some embodiments, application 231 provides example graphical user interfaces (GUIs) disclosed herein that enables the user to generate transactions between his or her blockchain wallet and a blockchain wallet of a target recipient of cryptocurrency funds.

In some embodiments, functionality of application 231 may be performed elsewhere in system 200 such as on one or more of nodes 204A-E in blockchain network 202. In these embodiments, blockchain network 202 can be configured to be capable of processing transactions. In some embodiments, functionality of application 231 may be performed elsewhere in system 200 such as on server 210. In some embodiments, server 210 may be a web server that enables users to operate a client 222 on user device 220 to access the functions of server 210. For example, client 222 may be a browser that enables the user to connect to a web portal or interface (e.g., a presentation interface) provided by server 210. Therefore, a user using user device 220 may initiate transactions to be verified by and added to blockchain network 202 via server 210.

Embodiments disclosed herein include example operations that can be performed at the user device 230 (e.g., implemented as application 231), at user device 220 (e.g., implemented at least in part by client 222), at server 210, and/or any combination thereof.

Social Platform with Cryptographic Objects

By connecting a cryptographic wallet to a social media profile, new interaction features are available. Cryptographic objects are collectables. Physical collectables, like trading cards are generally stored in binders. Collectors share with one another by laying out their binders to display their collection to one another. Children who have trading cards associated with games frequently do not play the associated game by the published rules to instead share their card binder with one another.

A need exists for a platform that enables owners of cryptographic objects to display their objects and carry on a conversation about those cryptographic objects. Thus, a graphic interface that presents the contents of a cryptographic wallet in a binder-like presentation is advantageous. In some embodiments, the binder-like presentation includes digital pages with flipping animations. The pages include renderings of the visual representations of the cryptographic objects. In other embodiments, the binder-like presentation is a simpler presentation of the visual representations of the cryptographic objects in a scrollable page, window, or web object.

In some embodiments a social media profile defined by a Yat (emoji sequence) has a linked cryptographic wallet which includes a record of on-chain behavior (e.g., dated ownership or participation in cryptographic object drops/ projects). Based on that on-chain behavior, users may opt-in to groups they have qualified to enter. Social groups may be public or private. Public groups are configured to influence a broader social feed. For example, when members of a group trend toward collecting a new set of cryptographic objects, a public newsfeed generates a notification.

Figure 3:
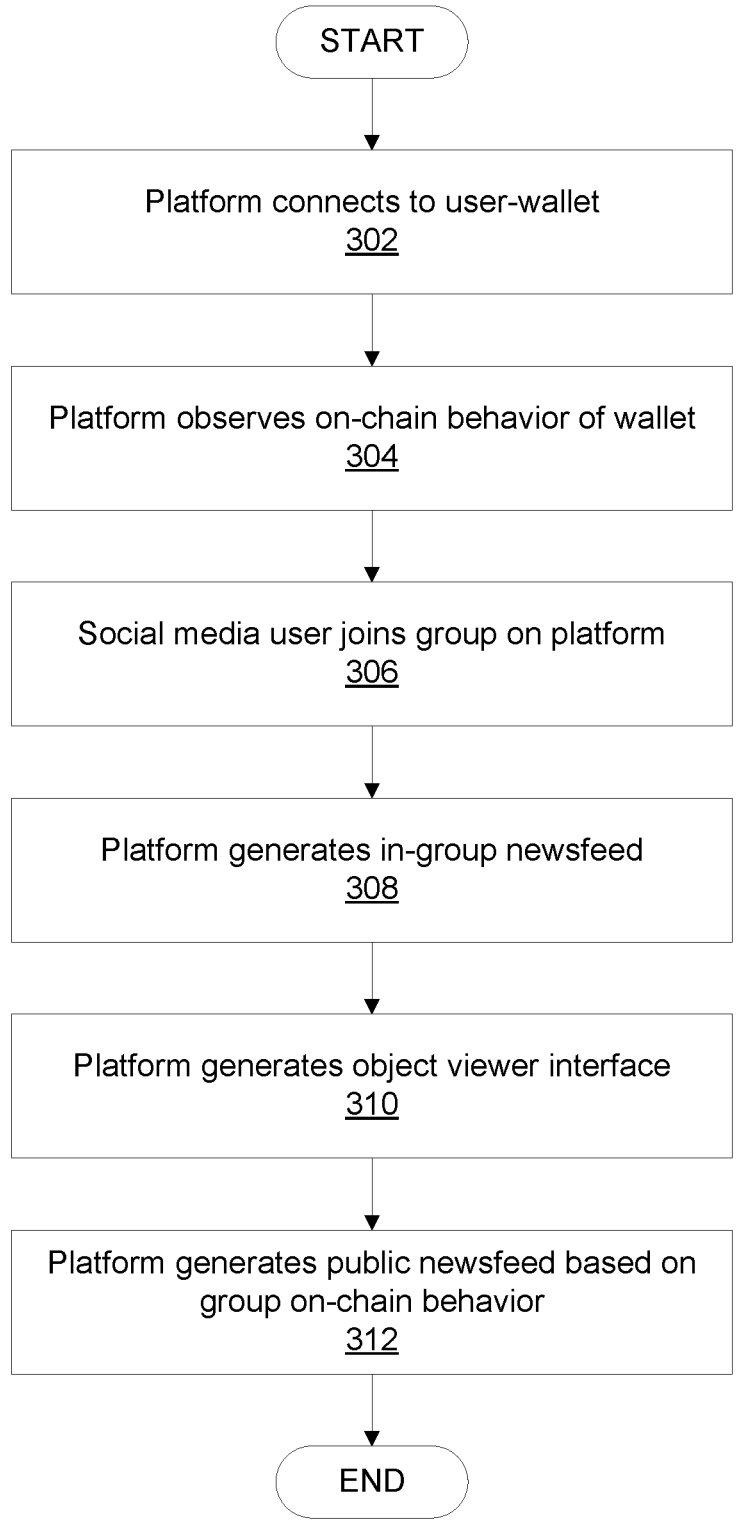
FIG. 3 is a flowchart illustrating graphic object social feeds.

FIG. 3 is a flow chart illustrating graphic object social feeds. In step 302, a user links a cryptographic wallet to a social media user profile. The linking is based either on reveal of login credentials to the social platform, or via zero-knowledge proof.

In step 304, the social media platform observes the contents of the cryptographic wallet and identifies the on-chain behavior of the user connected to the wallet. On chain behavior refers to current ownership, past ownership, ownership of a certain threshold of objects/tokens/coins, or a combination of thereof. Past ownership is definable based on absolute/binary statistics or time thresholds (e.g., held for a certain length of time, held within a certain threshold of a given timestamp or period, etc.).

Observing on-chain behavior is not human decipherable. On-chain behavior is connected to cryptographic records on the public blockchain data structure. Reference to a given cryptographic object is connected to machine inspection of many blocks in the data structure, many of which do not include reference to the sought or tracked cryptographic object. The process of observing requires scraping the blockchain for particular cryptographic objects.

For computational efficiency, the scraping or crawling of the blockchain only stores data related to wallets that are linked to the platform. In this way, the size of the database remains smaller than the entire blockchain itself, and calling the data is more efficient. New data is captured and added to the database based on listeners established for the relevant cryptographic objects and wallets. When a new wallet is added to the platform for tracking, the platform performs a more thorough machine inspection of the blockchain in order to capture the relevant wallet data into the database.

In step 306, a user joins a social network group based on meeting certain on-chain behavior criteria. In some embodiments, users are invited directly to groups. Groups are public or private. Private groups include social features internally within the group, while public groups include both social features internally and externally to the group.

In step 308, the platform provides an in-group newsfeed. The in-group news feed includes notifications reporting the current on-chain behavior of group members. Current on-chain behavior refers to the addition of new cryptographic objects to the respective linked cryptographic wallet, or participation in new cryptographic object projects (e.g., prior to the acquisition of a new cryptographic object).

In step 310, the platform provides an object display interface that enables group members to display in binder-like graphical representations of the cryptographic objects linked to their wallets. In some embodiments, the binder-like presentation includes digital pages with flipping animations. The pages include renderings of the visual representations of the cryptographic objects. In other embodiments, the binder-like presentation is a simpler presentation of the visual representations of the cryptographic objects in a scrollable page, window, or web object. The object display interface further includes chat features, such as text messages, media messages, and voice channels.

In step 312, the platform provides a public newsfeed. The public newsfeed is based on an analysis of public group behavior and trends. For example, a given group associated with current and past ownership of cryptokitties is observed to include a threshold percentage of users participating in a new cryptographic object drop. A notification is presented to the social network at large regarding the trend in participation. Other notifications pertain to tropics of newsworthiness.

Blockchain Explorer Platform

The typical behavior of NFT owners is to frequently acquire new digital objects. Determining which digital objects to acquire can be a difficult process for NFT owners. A blockchain explorer that displays not just the NFT searched for but also every related and commonly owned NFT makes the process of determining which NFT to acquire easier.

A given blockchain explorer platform searches the cryptographic ledger for all cryptographic wallets that contain NFTs. The blockchain explorer stores the image data associated with every NFT found in the cryptographic wallets. The image data is derived from underlying smart contracts that include the image data. and the blockchain explorer then links the image data to the corresponding wallet address. The blockchain explorer assigns a blockchain explorer identifier to each NFT. In some embodiments, the blockchain explorer identifier is a specific NFT.

For example, a specific NFT refers to a singular NFT and the blockchain explorer identifier is the name of the NFT such as Bored Ape #6723 or Cyptokitty #1. In another embodiment, the blockchain explorer identifier is a category of NFTs. For example, a category of NFTs refers to all of the NFTs in a collection. Thus, the blockchain explorer identifier can be bored ape yacht club or Cryptokitties. In another embodiment, the blockchain explorer identifier is a unique identifier. An example of a unique identifier is the name of the owner of an NFT. A blockchain explorer identifier for Bored Ape #6723 can then be Snoop Dog (or a unique string that corresponds to Snoop Dog) because he owns that particular NFT. In another example, a unique identifier can be any randomly assigned words or numbers that make it easier to find a specific NFT, category of NFTs, or cryptographic wallet. For example, a blockchain explorer identifier of "green ape" can be used to search for all bored ape NFTs that contain the color green. In another example, a blockchain explorer identifier for a cryptographic wallet can be blue123 or kitten456.

In some embodiments, the blockchain explorer is configured to connect commonly owned cryptographic wallet addresses under one blockchain explorer identifier. For example, the connection can be based on the transaction times of two different cryptographic wallet addresses. If transactions involving the two cryptographic wallet addresses consistently occur within a set time window from each other, then the blockchain explorer can classify the two cryptographic wallet addresses as being commonly owned. For example, where two wallets act within a matter of minutes (e.g., 1, 5, 10, 20, <60, etc.) of one another on multiple occasions (e.g., predetermined threshold, >3, >5, etc.) these are assumed to be operated by the same user. In another embodiment, the blockchain explorer connects two cryptographic wallet addresses under one blockchain explorer identifier based on transactions consistently occurring between the two cryptographic wallets. For example, where the first cryptographic wallet is consistently involved in transactions with a second cryptographic wallet then the blockchain explorer can classify the cryptographic wallet addresses as being commonly owned.

In some embodiments, a user searches for a particular blockchain explorer identifier. For example, where the blockchain explorer identifier is a specific NFT, then the blockchain explorer searches the stored image data for the NFT and the NFT's associated cryptographic wallet address. The blockchain explorer then displays the specific NFT that was searched for along with every other NFT found in the associated cryptographic wallet address. In another example, if the blockchain explorer identifier is a category of NFTs, then the blockchain explorer searches for the stored image data and associated cryptographic wallet address for all NFTs in the searched for category. The blockchain explorer then displays every NFT in the category along with every other NFT that shares a cryptographic wallet address with at least one of the NFTs in the searched for category. In another example, if the blockchain explorer identifier is a unique identifier, then the blockchain explorer searches for the stored image data and associated cryptographic wallet address of each NFT that has been linked to the unique identifier. The blockchain explorer then displays each NFT linked to the searched for unique identifier along with every other NFT that shares a cryptographic wallet address with at least one of the NFTs that have been linked to the searched for unique identifier.

In some embodiments, the results of the search are displayed in a graphic user interface. An example of the graphic user interface displays the image data of the searched for blockchain explorer identifier. In another example, the graphic user interface displays the image data using a binder-analog as described above. Embodiments of the graphic user interface display a separate binder for each cryptographic wallet address containing an NFT linked to the searched—for blockchain explorer identifier. Each binder can contain the image data of every NFT in the cryptographic wallet. A user on the blockchain explorer viewer is enabled to view the binder similar to paging through a physical book. In some embodiments, the graphic user interface displays the binders containing the most in-demand NFTs in the form of a public newsfeed. For example, the most in-demand NFTs are those NFTs or collections of NFTs that are involved in the most transactions or have received the most bids for purchase. When a transaction occurs for an in-demand NFT, the public newsfeed displays the NFT's binder for all users of the blockchain explorer to see. This displaying of the most in-demand NFTs allows users to see which NFTs are involved in transactions and then helps the users make a more informed decision about their next NFT transaction.

Additionally, embodiments of a public news feed on the blockchain explorer are configured to automatically generate notifications. For example, a user of the blockchain explorer receives notifications anytime a transaction occurs for a certain NFT, category of NFTs, or blockchain explorer identifier. The blockchain explorer can identify these transactions by scraping or searching the immutable cryptographic ledger for all recent transactions.

Group-Related Event Presentation Platform

Aspects of the present patent document relate to a platform that provides social or group features for users that own cryptographic objects. Users are presented with a newsfeed or a presentation interface that is navigable to show cryptographic objects linked to wallets of group members. In some examples, the platform and interface evoke a virtual electronic analogue of collectible binders that collectors use to showcase respectively owned collectibles (e.g., stamps, cards, etc.). As described herein, the platform interacts with or uses a blockchain explorer to detect cryptographic objects and object activity for cryptographic wallet addresses associated with the group. As such, aspects described herein enable a particular group member to see cryptographic objects (or visual representations thereof) that are owned by other group members.

Thus, aspects described herein promote or establish an engaged community, in which activity and involvement among individual members is driven in large part due to visualization of group ownership of cryptographic objects. An individual member that sees the cryptographic objects owned by other members will also want to own their own cryptographic objects. With cryptographic objects being tied with values and rarities, some group members are motivated by envy or competition to also own rare and valuable cryptographic objects, or to trade for owned objects.

In an example scenario, Alice and Bob are users that collect cryptographic objects and that belong to a group or community of users. With Alice's collection being visualized and broadcast throughout the group, Bob discovers one of Alice's cryptographic objects and engages in a conversation with Alice about a trade or purchase. As another example, Bob seeks the attention of other group members and responsively mints or purchases more cryptographic objects to rival those owned by Alice.

That is, members become eager to actively deal in cryptographic objects in response to group-wide visualization or presentation of group-owned cryptographic objects. Excitement and involvement akin to collectors of real-world collectibles (e.g., baseball cards, game cards, stamps, tokens) is then captured via such a group-wide visualization or presentation of cryptographic objects.

In various aspects, visualization or presentation of cryptographic objects is linked to the cryptographic objects themselves. In particular, cryptographic objects include non-fungible tokens (NFTs) that are associated with image data that represent artwork, videos, animations, images, and/or the like whose ownership is indicated by the NFTs. Group-wide presentation of visual representations of the cryptographic objects then involves retrieval or obtaining the image data associated with specific cryptographic objects.

In some examples, a blockchain explorer (examples of which described herein) is used to locate and retrieve a visual representation (e.g., image data) linked to a given cryptographic object. In particular, the retrieval of the visual representation involves execution of a smart contract associated with the given cryptographic object, in some examples. An example smart contract includes an external link at which the data for the visual representation is obtained. Another example smart contract itself stores the data for the visual representation. Yet another example smart contract stores instructions for generating the visual representation for a cryptographic object.

Beyond visual representation of the cryptographic objects themselves, a need exists to demonstrate additional information related to the cryptographic objects. In particular, further than simply presenting linkage of certain cryptographic objects to the group, a need exists to demonstrate information related to object events that involve group-owned objects. For example, such object events include minting of new cryptographic objects, purchase or sale of cryptographic objects, exchange or trade of cryptographic objects, and/or other events that are expected to cause excitement or interest among community members.

Other object events include a group member holding onto a particular cryptographic object for a significantly long length of time, which plays into other group members' perception of the particular object (e.g., with respect to value). Again, indication of such an object event sparks conversation and involvement among group members. In an example, Bob would be impressed at Alice's restraint on holding a valuable cryptographic object for so long and would engage in individual or group discussion if Bob was made aware of such activity by Alice. In another example, Bob is inspired (e.g., competitively) to hold cryptographic objects for longer lengths of time if Bob is made aware of such activity by Alice.

Further, some object events among the group members are related, such as the minting of cryptographic objects belonging to the same collection or set by two different group members. Indication of such related object events prompts discussion among the group members and promotes a sense of social community among the group members.

Therefore, while group-wise visualization of cryptographic objects owned by a group causes some amount of engagement and excitement, further levels of excitement are unlocked if activities and events related to the objects are also indicated to the group members. Group chatter and conversation is likely to increase if group members are made aware on dynamic ownership and macro-scale activity related to the group-owned cryptographic objects.

Additionally, with a purpose of the platform and interface being the showcasing of many cryptographic objects owned by group members, such additional information needs to be demonstrated compactly. Otherwise, significant visual space is occupied by additional information, and a number of cryptographic objects that are showcased at a time is reduced.

Thus, the present patent document provides implementations related to the presentation of event signifiers with visual representations of cryptographic objects owned by group members, and example implementations discussed herein address at least the aforementioned needs. Event signifiers are used to signal the occurrence of individual object events or macro-level (e.g., group-wide, combined) events.

Event signifiers capture the attention of group members and cause excitement and participation among the group members in activities related to cryptographic objects. As such, excitement and interest in events that cause significant shifts in group dynamics increase, as the event signifiers to accompany said shifts are presented across the group.

In various aspects, the event signifiers include visuals, audio, or haptic feedback that directs the attention of a particular group member to events relevant to the group. As group events occur over time, these event signifiers form a dynamic, entertaining, and immersive presentation that makes the particular group member want to participate and get in on the action.

These event signifiers represent add-ons or supplemental presentations with visual representations of cryptographic objects, and the event signifiers are not permanently attached to the image data linked to a cryptographic object, in some examples. Instead, event signifiers are assigned to a cryptographic object for intentional presentation based on particular relevance to the group and relation to other group events. In some examples, the platform stores data that define the visuals, animations, audios, haptic patterns, and/or the like of event signifiers off-chain, and the platform assigns the event signifiers ad hoc upon occurrence of an object event.

Example event signifiers are configured to be compact and, while capturing the attention of group members, do not detract from the visual representations of the cryptographic objects themselves. Example event signifiers are tied to the visual representations of cryptographic object involved in or relevant to corresponding events. For example, a visual aspect of an event signifier includes a frame, bar, badge, overlay, or other visual add-on or indicator that is connected to or located near a visual representation of a cryptographic object within a presentation interface.

Example visual aspects of an event signifier are dynamic and include animations that are presented for a temporary length of time on the presentation interface. In some examples, exciting visual animations are presented in response to favorable and significant events occurring. For example, a "heating up" visual animation with rising flames is presented as multiple group members purchase cryptographic objects belonging to the same collection. In some examples, horrible, taunting, and/or dramatic visual animations are presented in response to unfavorable significant events occurring. For example, animated skulls or sad emotes are presented in the event of a group member selling a cryptographic object at a significant loss in value.

An audio aspect of an event signifier is played as a visual representation of a relevant cryptographic object appears in the presentation interface, played in response to user interaction with a visual representation of a relevant cryptographic object, and/or the like. The audio aspect invokes certain emotions or moods of the listener that correlate with a significance of the corresponding object event. For example, celebratory music is played when a significantly rare or valuable cryptographic object is minted by a group member. As another example, a foreboding audio snippet is played when a group member is about to hold a particular cryptographic object for longer than a record length of time.

In some examples, the event signifiers are pre-defined and correspond to various levels of event significance. The levels of event significance categorize object events according to values and volumes of cryptographic objects. As such, a given object event is categorized and assigned with an event signifier corresponding to the category, for example. The corresponding event signifier then indicates or represents the value or volume of cryptographic objects related to the given object event. In some examples, an event signifier indicates non-activity with a cryptographic object, such as holding the cryptographic object for an extended length of time.

In some examples, multiple event signifiers correspond to multiple levels, tiers, thresholds, or categories of value of cryptographic objects that are minted, purchased, or sold in a given object event. These levels, tiers, or categories by which event signifiers are assigned to an object event are defined with respect to fiat currency amount (e.g., USD), cryptocurrency amount (e.g., ETH, BTC), and/or the like.

Generally, the value associated with a given object event relates to the value of the cryptographic object(s) involved in the given object event. Further, in some examples, the value by which a given object event is categorized is a combined value of cryptographic objects involved in the given object event and in other related object events. These other object events are related to the given object event by occurring within a same pre-defined time period (e.g., an hour, a day, a week). Additionally or alternatively, the other object events are related to the given object event by involving cryptographic objects belonging to the same object collection or set as the given object event.

Specifically, in some examples, the other object events involve other group members, such that a combination of a given object event and other related object events remains relevant and insular to the group of users. As such, group activity, such as multiple group members minting objects from the same object set/collection, is identified and used to assign event signifiers to events. Another example of group activity includes multiple group members purchasing objects having values that surpass a given level, tier, or threshold. Thus, in this "macro-scale" example, each purchase of a valuable object by one of the multiple group members is a related object event, and the combined value or volume of the objects is used to assign an event signifier to each event.

In some examples, the value of a given object event relates to a relative value of the cryptographic object(s) involved in the given object event. That is, the relative value of a given cryptographic object describes a relative profit or loss with respect to (crypto)currency due to the given object event (e.g., a purchase or a sale).

In some examples, the value of a given object event relates to a set-wide value of an object set or collection to which the cryptographic objects of the given object event belong. For example, as a result of the given object event, a floor price of the object set or collection (e.g., the lowest value of an available object in the set) increases. Thus, this increase in floor price is included in the value of the given object event, in some examples.

Accordingly, a given object event is associated with a value by which the given object event is categorized and assigned with a corresponding event signifier. Example values include individual event values, combined event values, relative object values, set-wide values, and/or the like.

As indicated, a given object event is also associated with a volume by which the given object event is categorized and assigned with a corresponding event signifier. A volume of a given event refers to a number of cryptographic objects that are minted, purchased, sold, traded, and/or the like during the given event. In some examples, the volume of an event includes a set-specific volume, or a number of cryptographic objects belonging to the same object set or collection that are minted, purchased, sold, traded, and/or the like.

Thus, to determine the value and/or volume of a given object event in order to assign a particular event signifier to the event, event or transaction data recorded by the immutable cryptographic ledger is referenced. That is, the ledger records a value and volume of cryptographic objects involved in a given object event. The ledger also records (and is searched for) other related object events, and the value/volume of cryptographic objects involved therewith.

An example value of a cryptographic object is related to a floor price of the collection to which the cryptographic object belongs. The floor price is determined based on the lowest price of an available object of the collection. In some examples, the floor price is retrieved from an off-chain marketplace platform that manages, curates, or auctions collections of cryptographic objects. An example off-chain marketplace platform includes an application programming interface (API) at which a floor price of a particular object collection is queried.

As discussed, assignment of an event signifier to a given object event (or non-event) is based on a degree of non-activity. For example, based on comparing a length of time that an object is held to various thresholds, a particular event signifier is assigned to the presentation of the object. Lengths of time that an object is held are determined based on entries recorded in the immutable cryptographic ledger and timestamps associated therewith. For example, a holding time is determined based on a time that has elapsed since the holder first obtained the object.

In some examples, the levels, tiers, threshold, or categories with respect to value and volume are configurable by members of the group of users. In some examples, one or more designated group leaders of the group of users are permissioned to configure the levels, tiers, thresholds, or categories. As such, configuration and customization of categories and assignment of event signifiers to events is enabled for group members.

Accordingly, aspects described herein generally relate to detection of individual object events or macro-scale events, assigning of event signifiers to detected events, and presentation of the event signifiers to group members to inform on group activity. The event signifiers are presented with a navigable presentation of visual representations of cryptographic objects (a "binder"-like presentation), in some examples.

Presentation of owned cryptographic objects along with event signifiers that indicate activities related to the objects is exciting for users. Users are kept up to date on activities of their peers, and the users are accordingly encouraged to participate themselves. By directly seeing fun and dynamic signifiers with visuals and/or audio accompanying a purchase of a rare or valuable cryptographic object, a user is motivated to also purchase a rare or valuable cryptographic object. By being presented with an event signifier for others minting objects of a given collection, a user is also motivated to mint objects of the given collection. Group-wide participation, discussion, and enjoyment of cryptographic objects accordingly stems from group-wide presentation of cryptographic objects and event signifiers.

In some examples, the event signifiers are compact or low-footprint, and some event signifiers are suppressed in some instances. For example, when a large wave of object events are detected, a subset of the assigned event signifiers are suppressed. As such, a user is not overwhelmed and distracted from the visual representation of the cryptographic objects themselves.

Selection of certain event signifiers for suppression is based on the various levels of significance. For example, event signifiers corresponding to low levels of object value or volume are suppressed and non-prioritized.

Figure 4:
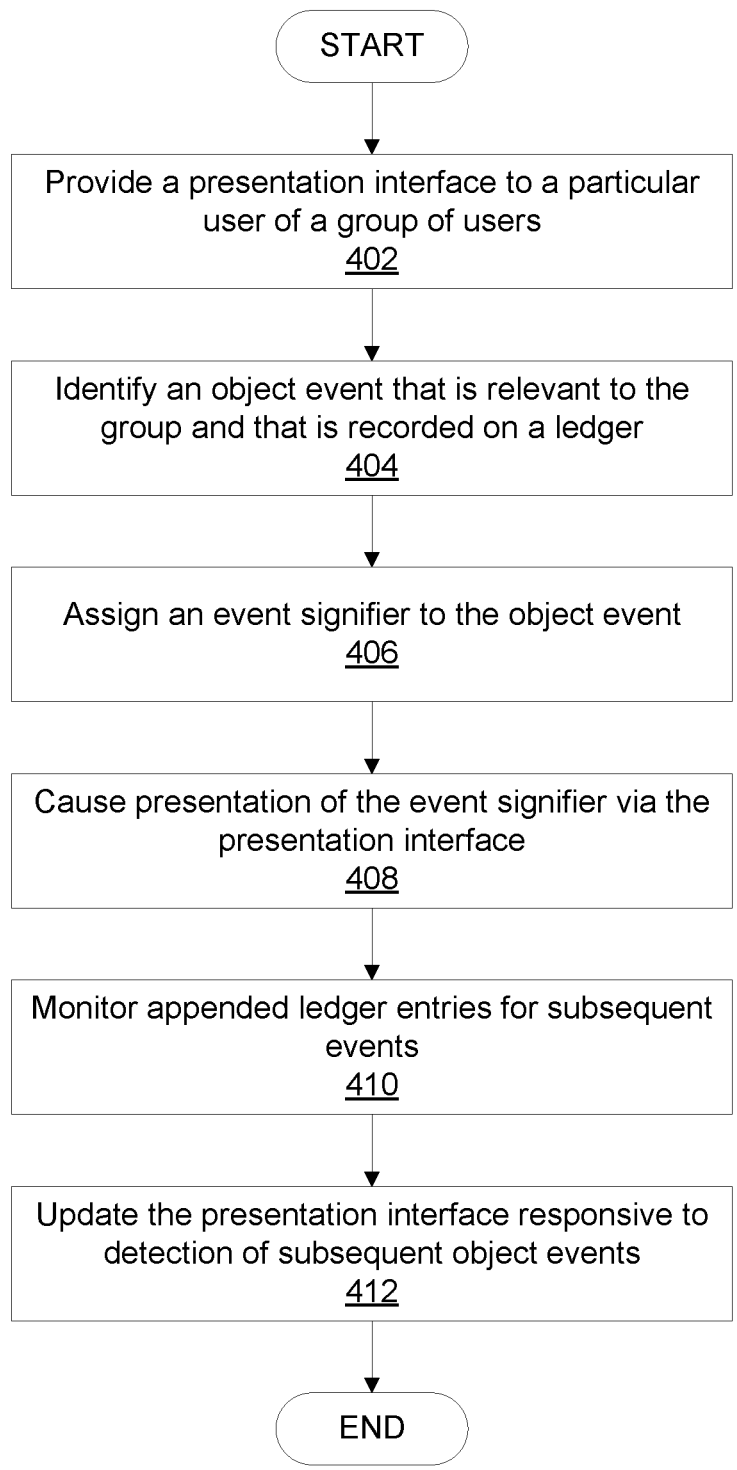
FIG. 4 is a flowchart illustrating example operations for presenting event signifiers with visual representations of cryptographic objects on a social or group-based platform.

Turning now to FIG. 4, a flow chart of example operations for presenting event signifiers on a social or group-based platform is illustrated. With the example operations, object events related to group members are indicated such that individual group members are informed on cryptographic object activity of other group members. Examples discussed herein are implemented in newsfeed-type interfaces that are navigable and dynamically update in response to the occurrence of new events. Thus, as object events occur, event signifiers are presented shortly thereafter.

In various aspects, examples relating to presentation of event signifiers are employed with example newsfeed interfaces and object display interfaces discussed herein. In some examples, the operations of FIG. 4 are performed by a newsfeed platform, a social platform, an event platform, a system implementing a newsfeed or social platform, and/or the like.

At step 402, a platform provides a presentation interface to a particular user of a group of users. The group of users is associated with a plurality of cryptographic wallet addresses to which certain cryptographic objects are linked. Accordingly, an immutable cryptographic ledger is scraped or searched based on the plurality of cryptographic addresses to identify all cryptographic objects owned or linked to the users. In some examples, the presentation interface presents visual representations of the cryptographic objects owned by the group of users. For example, the presentation interface includes an interface provided according to example steps of the flow chart of FIG. 3.

At step 404, the platform identifies an object event that is relevant to the group of users. Specifically, the object event is recorded by the immutable cryptographic ledger and identifies at least one of the cryptographic wallet addresses associated with the group. The object event is identified by searching or scraping the immutable cryptographic ledger based on the cryptographic wallet addresses associated with the group. In some examples, the ledger is specifically searched within a time window that has elapsed since the last time the presentation interface is provided to the particular user.

At step 406, the platform assigns an event signifier to the object event. The event signifier includes at least one of an audio, a persistent visual, or a dynamic visual that are presented via the presentation interface. The platform assigns the event signifier to the object event based on a value and volume of particular cryptographic objects involved (e.g., minted, purchased, sold, traded) in the object event. In some examples, the platform assigns the event signifier to the object event further based on values and volumes of objects involved in other object events related to the object event, or a macro-scale or combined value or volume of objects across multiple object events.

In some examples, the platform assigns the event signifier based on a temporal aspect related to the object event. For example, the platform assigns a particular event signifier for a holding time for an object exceeding a threshold. As another example, the platform assigns a particular event signifier for an object that was held for a significant length of time finally being sold or traded.

At step 408, the platform causes a presentation of the event signifier at the presentation interface. Specifically, the platform presents the event signifier in connection with visual representations of the particular objects involved in the object event in the presentation interface. For example, the audio of the event signifier is played when a visual representation of an involved cryptographic object appears or is interacted with in the presentation interface. As another example, the persistent visual of the event signifier (e.g., a frame, a bar, a badge) is visually tied to the visual representation of the involved cryptographic object. As yet another example, the dynamic visual of the event signifier is initiated when the visual representation of the involved cryptographic object appears or is interacted with in the presentation interface.

Said visual representations of the involved objects is tied to the newsfeed and/or object display interface discussed in relation to FIG. 3. For example, the newsfeed or object display interface is a "binder"-like graphic representation of cryptographic objects linked to the group of users, and the event signifier is presented within the newsfeed or object display interface.

At step 410, the platform monitors the immutable cryptographic ledger for subsequent object events based on monitoring appended ledger entries of the ledger. For example, while the presentation interface (e.g., the newsfeed and/or object display interface discussed with FIG. 3) is being provided to the particular user, subsequent object events involving the particular user or other group members occur. The platform identifies these subsequent object events by searching or scraping the immutable cryptographic ledger based on the cryptographic wallet addresses of the group members. To conserve computing resources, the platform monitors the immutable cryptographic ledger only while the presentation interface is being provided to the particular user. For example, the monitoring is intended to enable updates on group activity to be presented to the user in an ad-hoc manner, or as the subsequent events occur.

At step 412, the platform updates the presentation interface responsive to subsequent object events being detected. As with the aforementioned object event, the subsequent object events are assigned with event signifiers. The platform then updates the presentation interface to present visual representations of the objects involved in the subsequent object events, along with the event signifiers assigned to the subsequent object events.

In some examples, the platform further determines whether or not to suppress an event signifier assigned to an object event. As discussed above, a large wave or flood of object events occurring near simultaneously could result in an overload of visual or auditory stimulation to the particular user. Such overload distracts the particular user from the visual representations of the objects themselves and increases difficulty in understanding individual group events. As such, object events or their event signifiers are ranked, and lower-ranked event signifiers are suppressed, for example.

Turning now to FIGS. 5A-F, various example presentations and interfaces in accordance with aspects described herein are illustrated.

Figure 5A:
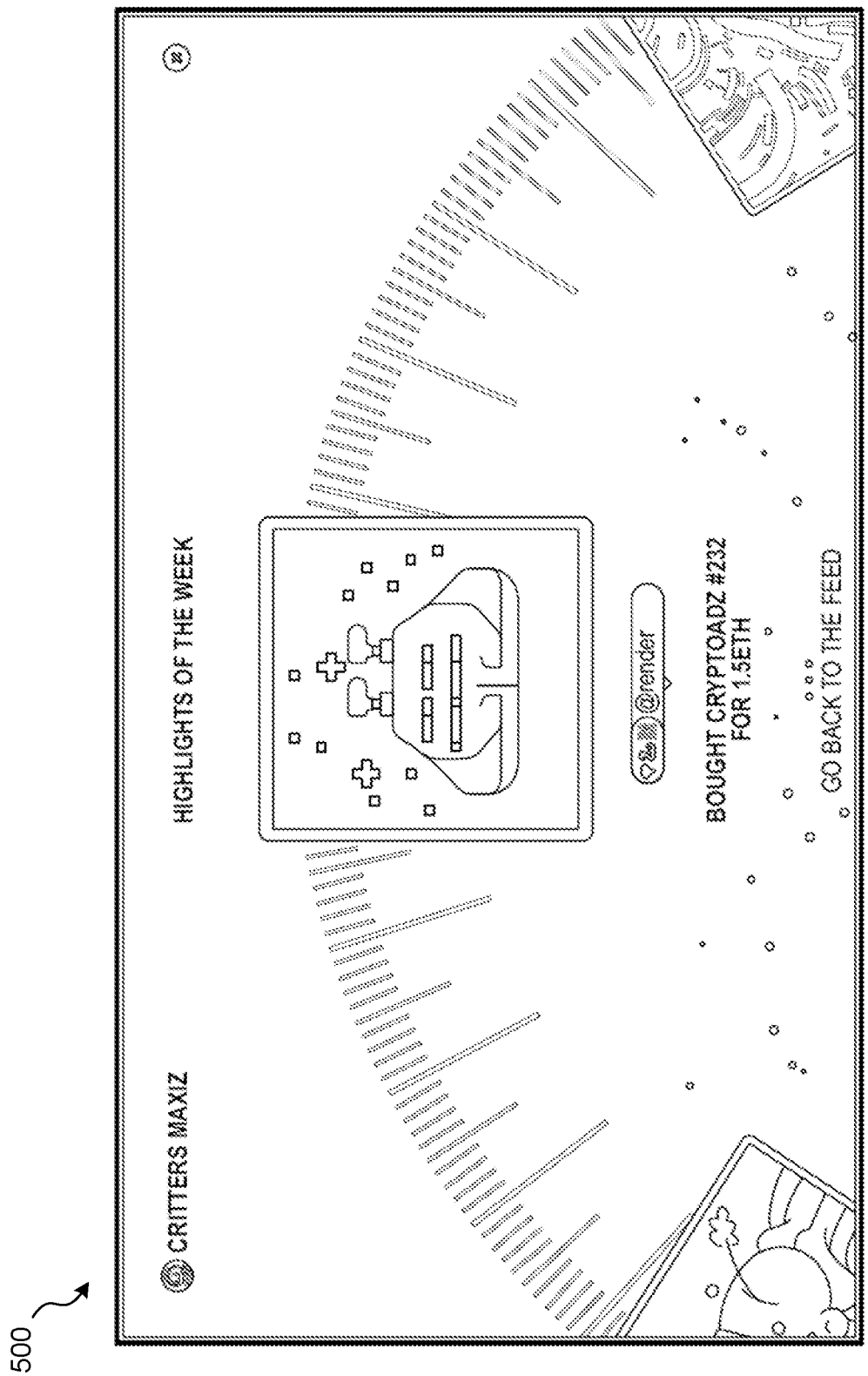
FIG. 5A illustrates an example user interface for presenting object events that have occurred since a time that the interface was last provided to a user.

FIG. 5A illustrates a highlight of the week, recap, or summary interface 500. The summary interface 500 indicates object events that have occurred since the last time the presentation interface was provided to a user. Specifically, the summary interface 500 presents visual representations of the cryptographic objects involved in such object events, as well as event signifiers based on the value or volume of the involved objects. The summary interface 500 thus makes a particular user aware of historical object events.

In some examples, the summary interface 500 includes a rotating display that individually focuses and spotlights on each event for some time. In some examples, various animations and displays are presented to rank the past-occurring object events with respect to significance to value, volume, or temporal aspects. For example, an animation of different cryptographic objects rising above others is played to demonstrate different respective values or event significances.

In some examples, the platform presents the summary interface 500 responsive to a user signing on or accessing the platform. As such, the summary interface 500 is the first thing the user sees when accessing the platform and sets the user in the mood to see other exciting activity related to group-owned cryptographic objects being signified in the platform.

Figure 5B:
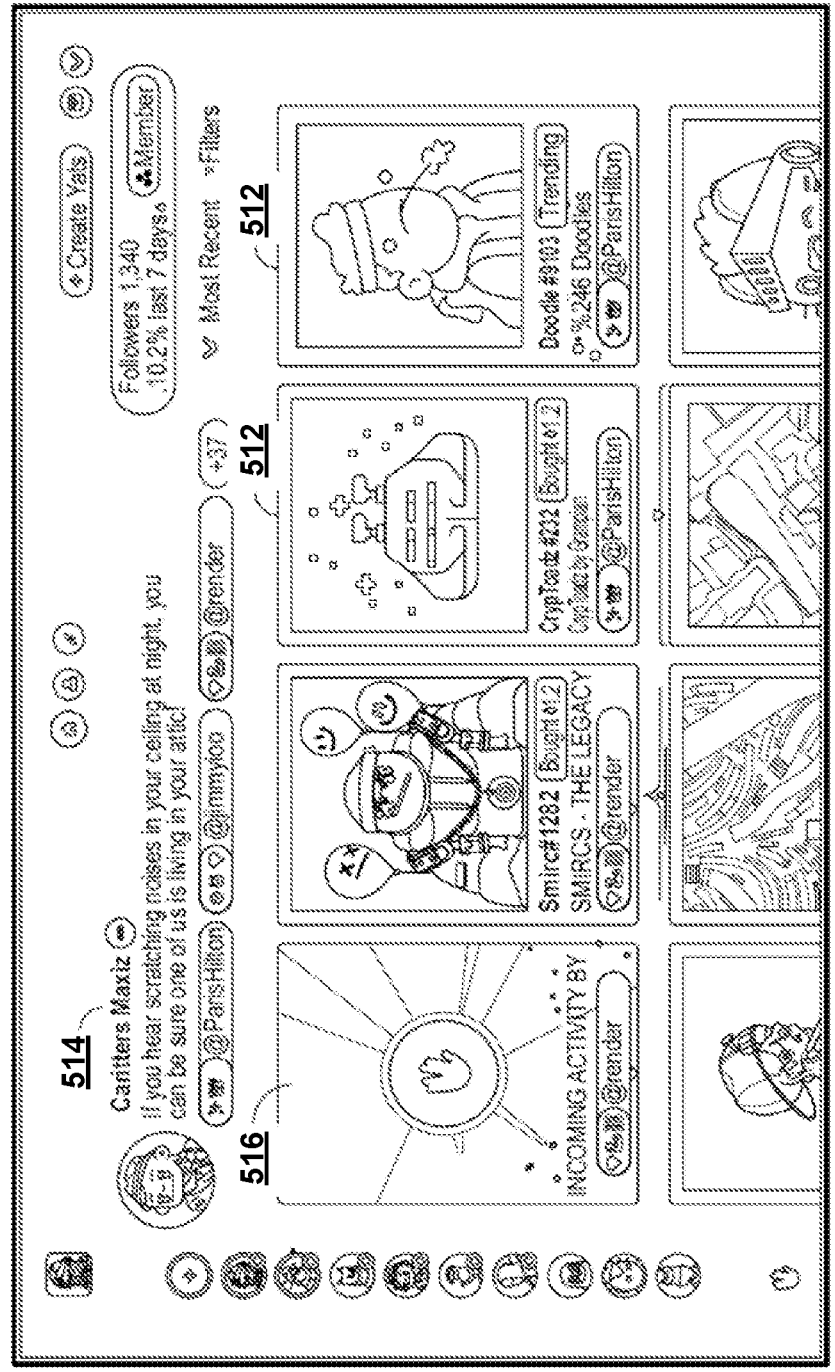
FIG. 5B illustrates an example user interface for dynamically presenting cryptographic objects that are linked to or that become linked to a group of users.

FIG. 5B illustrates a presentation interface 510. The presentation interface 510 is or includes a newsfeed and/or object display interface, as discussed with FIG. 3. As shown, visual representations 512 of multiple cryptographic objects linked to various members of a group 514 are presented.

According to newsfeed-like characteristics, the platform updates the presentation interface 510 each time a new event relating to a cryptographic object owned by the group occurs. As such, the visual representations 512 slide over and down to make room at the top of the "binder" space for visual representations 512 of new cryptographic objects.

Upon detection of a subsequent object event (e.g., minting or purchase of a cryptographic object), the presentation interface 510 is updated. As illustrated in FIG. 5B, a loading indicator 516 is presented to indicated that a subsequent object event has been detected. In some examples, the loading indicator 516 is a placeholder in anticipation of the visual representation of the involved object(s) being obtained and presented.

In some examples, the loading indicator 516 includes a visual akin to a slot machine, or a visual configured to drum up anticipation for an upcoming visual. The loading indicator 2216 accompanies similarly anticipatory audio, such as a drum roll, increasingly loud chimes or rings, and/or the like. With the loading indicator 516, the user is explicitly informed that additional group activity has occurred and that detailed information regarding the involved object(s) will soon be presented.

In some examples, the loading indicator 516 is presented as the platform retrieves the image data linked to a cryptographic object for presenting the visual representation of the cryptographic object. As discussed, retrieval of the image data includes executing a smart contract for the cryptographic object to access an external link, to generate or recreate the image data, or to extract the image data from the smart contract itself. Thus, the platform presents the loading indicator 516 in the presentation interface 510 at least for the duration of such operations.

Figure 5C:
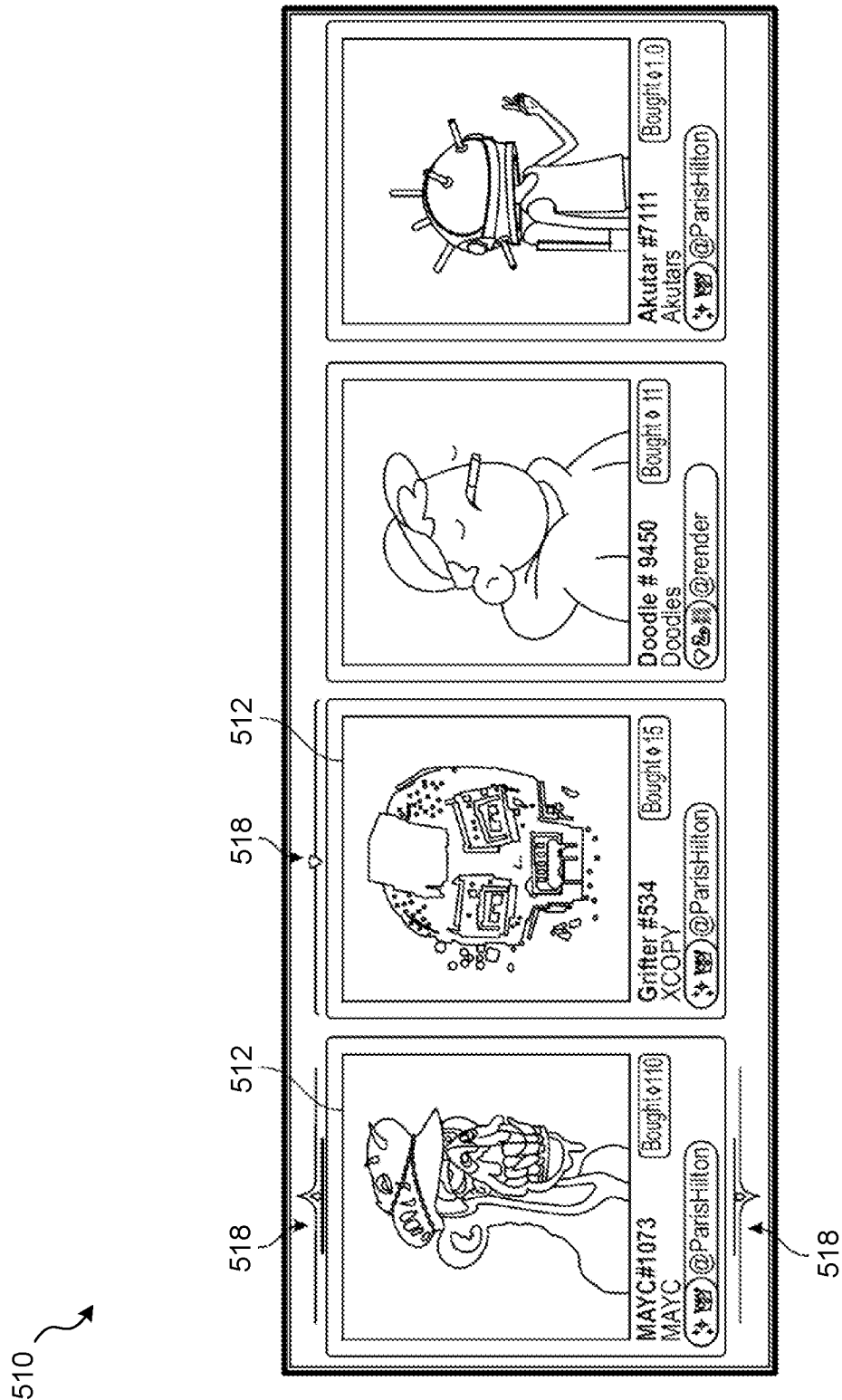
FIG. 5C illustrates an example user interface for presenting event signifiers that are indicative of significant value or volume of cryptographic objects linked to a group of users.

FIG. 5C illustrates a portion of the presentation interface 510. In particular, event signifiers 518 are presented. As illustrated, the event signifiers 518 are tied to the visual representation 512 of certain cryptographic objects. For example, an event signifier 518 accompanies and is positioned above the visual representation 512 of the cryptographic object named Grifter #534.

The event signifier 518 for Grifter #534 indicates a particularly significant value of the object event in which Grifter #534 was involved. For example, the event signifier 518 for Grifter #534 indicates that Grifter #534 was purchased for a significant amount of value. As another example, the event signifier 518 for Grifter #534 indicates that multiple other group members recently also minted or purchased cryptographic objects of the Grifter set or collection. As yet another example, the event signifier 518 for Grifter #534 indicates that a floor price of the Grifter set or collection has increased by a significant amount with the purchase of Grifter #534 by a group member.

In some examples, an event signifier indicates events that occur between two or more group members. For example, trade, purchase, sale, or other event that involves more than one cryptographic address associated with the group of users is indicated by a particular event signifier. As such, activity that is internal or confined within the group is differentiated with activity that extends outside of the group.

FIG. 5C also illustrates event signifiers 518 being presented for another cryptographic object named MAYC #1073. The event signifiers 518 for MAYC #1073 are different than the event signifier 518 of Grifter #534. The difference in event signifiers suggests to a user that the object events involving each cryptographic object differ in value or volume. As one example, the difference in event signifiers indicates that MAYC #1073 was purchased for a higher amount of cryptocurrency than Grifter #534. As another example, the difference in event signifiers indicates that members of the group have recently minted or purchased more objects from the MAYC collection than from the Grifter collection.

Thus, as exemplified in FIG. 5C, event signifiers are presented to indicate significant activity among group members and are differentiated based on a degree of value or volume of the different activities of the group members. In some examples, different visual size, auditory volume, and/or the like of the event signifiers is based and conveys the value or volume of the cryptographic objects. Some example event signifiers are configured to indicate temporal aspects of events. For example, a size of a given event signifier correlates with a length of time that the object was contiguously held by a user.

As discussed herein, examples of event signifiers 518 include dynamic visuals. In one example, upon a newsfeed-like update of the presentation interface 510 to include the visual representation 512 of the MAYC #1073 object, a flash across the screen or a wave-like visual is presented due to the significance of the value of MAYC #1073. In another example, the frame or bar of the event signifier 518 connected to MAYC #1073 periodically flashes, moves, glows, and/or the like. In yet another example, in response to addition of the visual representation 512 of the MAYC #1073 object to the newsfeed-like interface, other visual representations 512 of other objects vibrate or shake for a temporary length of time.

Figure 5D:
FIG. 5D illustrates an example event signifiers that is indicative of significant value or volume of a cryptographic object that is linked to a group of users.

FIG. 5D illustrates another example of an event signifier 518 that is presented in connection with a visual representation 512 of a cryptographic object linked to a group member. In the illustrated example, the event signifier 518 is a frame that is visually presented surrounding the visual representation 512. As an example, the frame indicates that a floor price of the Invisible Friends set/collection has increased.

In some examples, the frame is a dynamic and/or animated visual. For example, flame visuals that compose the frame oscillate and wave to emulate real-world chaotic motion of flames. As another example, in response to occurrence of the event (e.g., purchase of the object, holding of the object for significant time, floor price increase of the collection), the flame visuals trace around the visual representation 512 at a speed until the frame becomes contiguous. In yet another example, the frame is presented after a dynamic explosion-like animation that surrounds the visual representation 512. In some examples, presentation of the frame is accompanied by an audio.

Figure 5E:
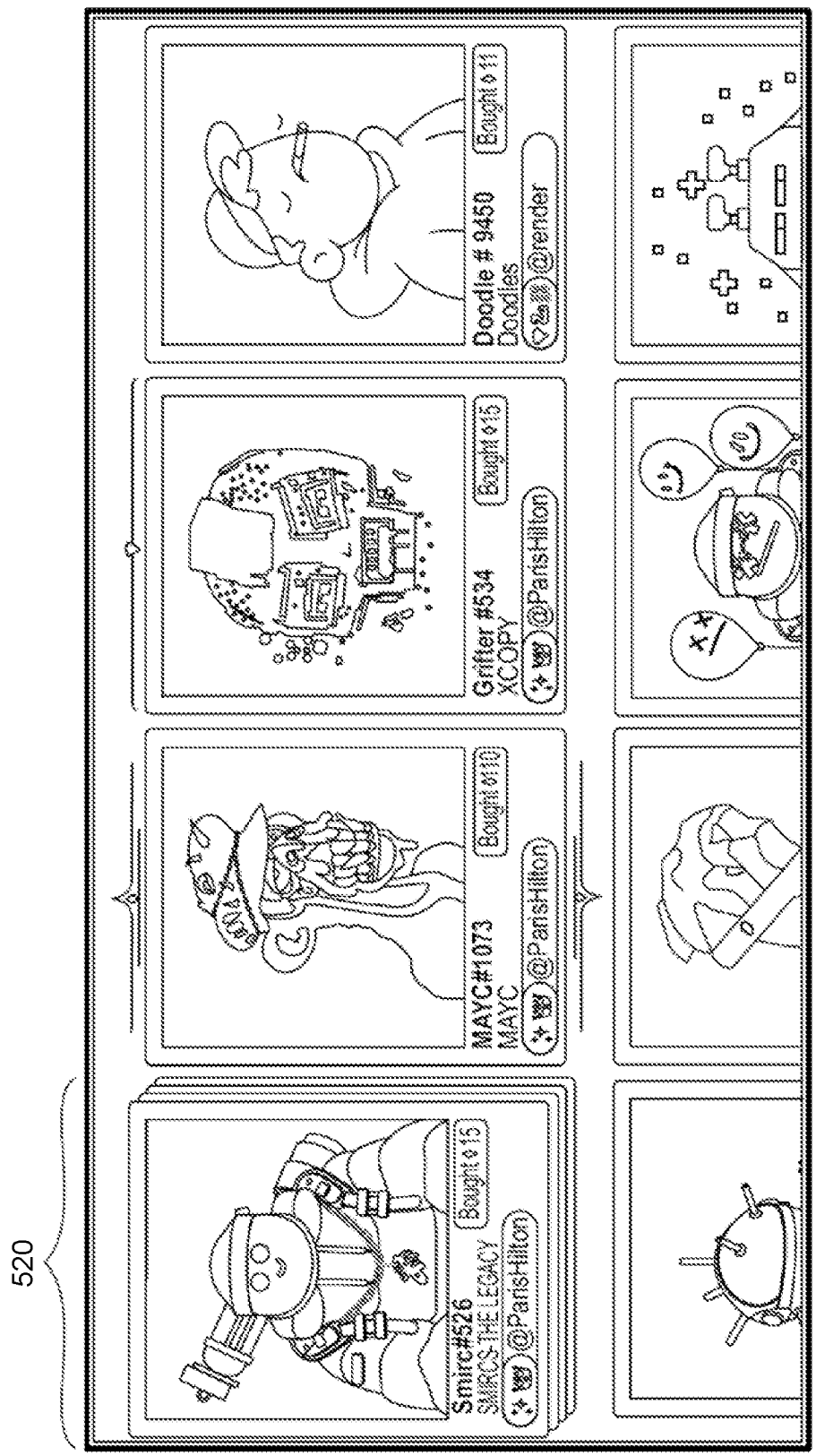
FIG. 5E illustrates an example compact representation of cryptographic objects linked to a group of users.

FIG. 5E illustrates a compact representation 520 for multiple cryptographic objects. The multiple cryptographic objects are involved in an object event (e.g., minting, purchasing), and the compact representation 520 is configured to efficiently (with respect to visual space or footprint) indicate the volume or quantity of objects involved in the object event. As illustrated, the compact representation 520 includes a stack of visual representations of the multiple cryptographic objects. That is, the compact representation 520 visualizes an aggregation of the multiple cryptographic objects, or the visual representations thereof.

Figure 5F:
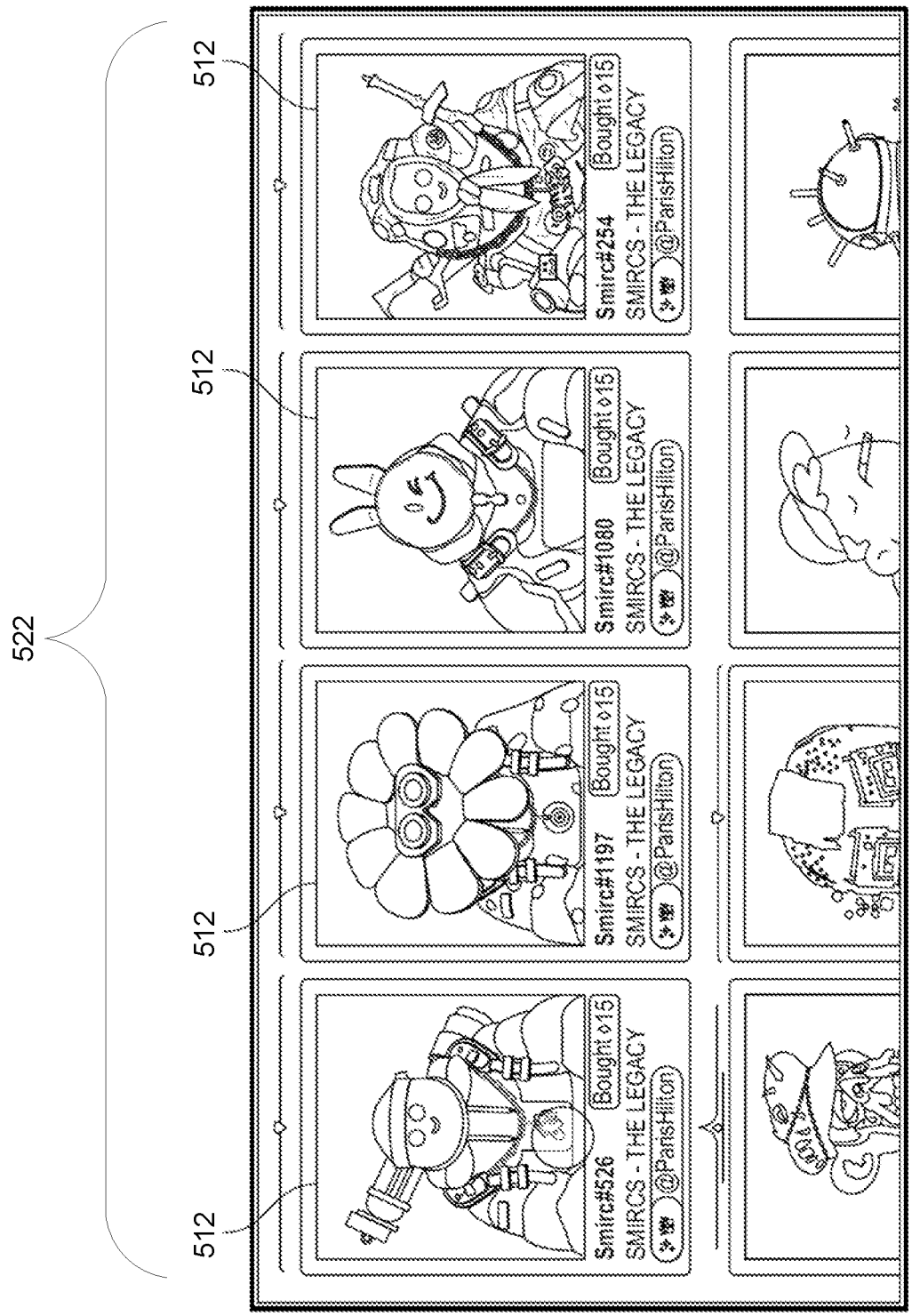
FIG. 5F illustrates an example expanded representation of cryptographic objects linked to a group of users.

FIG. 5F illustrates an expanded representation 522 of the multiple cryptographic objects. In some examples, toggling between the compact representation 520 and the expanded representation 522 is enabled and caused via user input. As illustrated, the expanded representation 522 presents the visual representation of the multiple cryptographic objects separately. In some examples, the transition from the compact representation 520 and the expanded representation 522 includes an animation that evokes dealing of physical cards. For example, individual visual representations 512 slide out from the top or the bottom of the stack of visual representations shown in the compact representation 520.

Figure 5G:
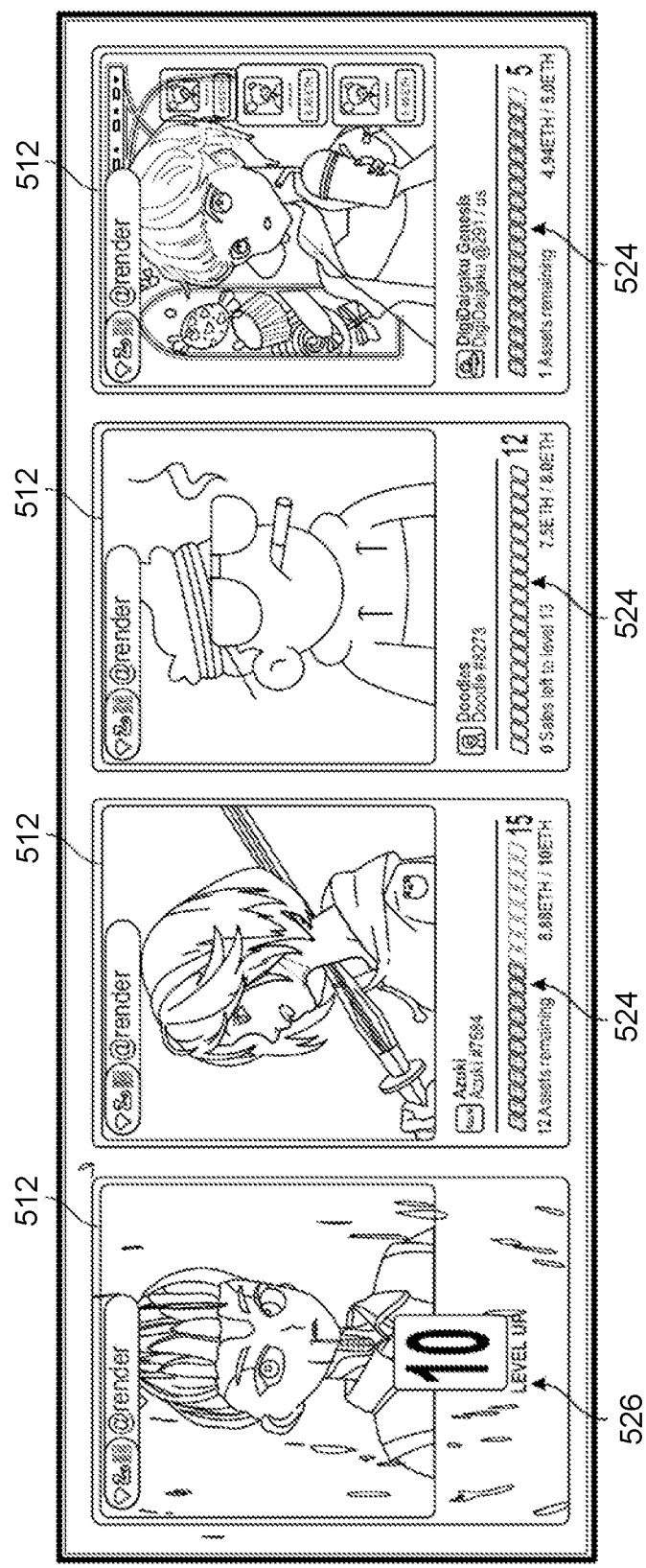
FIG. 5G illustrates example event signifiers relating to collection-specific values.

FIG. 5G illustrates another example portion of the presentation interface or newsfeed-like interface that presents visual representations 512 of cryptographic objects owned by a group. In particular, the platform presents visual representations 512 along with temporal event signifiers 524 in the presentation interface. In some examples, temporal event signifiers 524 indicate a progress, a completion percentage, an estimated time of arrival (ETA), a countdown, and/or the like in relation to a given object event.

In the illustrated example, the temporal event signifiers 524 are progress bars that indicate progress towards a floor price increase. A floor price of a collection to which a cryptographic object belongs represents the lowest value of the available objects in the collection. Upon the lowest-valued objects being rendered unavailable (e.g., by purchase), the floor price increases to the next lowest value. Thus, in the illustrated example, the temporal event signifiers 524 indicate how many of the lowest-valued objects (valued at the current floor price) still remain available and how many have been rendered unavailable.

Another object event that is forecasted by temporal event signifiers 524 includes full group participation in an object set or collection. An example temporal event signifier 524 includes a progress bar or a completion percentage that indicates how many members of the group own an object of a given object set or collection. Presentation of such a temporal event signifier 524 encourages group-wide participation in specific object sets or collections.

Yet another object event that is forecasted by temporal event signifiers 524 includes holding an object for a specific length of time. In some examples, the temporal event signifiers 524 then encourage positive time-rank behavior and are compactly present time-rank information.

A temporal event signifier 524 is updated to reflect and indicate updates to the progress, completion, ETA, countdown, and/or the like as time progresses and additional events occur. For example, in response to a purchase of a floor-price object in a collection, a temporal event signifier 524 for the collection is updated to reflect the fewer number of floor-price objects available before the floor price increases. Therefore, across various examples and applications of a temporal event signifier 524 (including the examples discussed above), the temporal event signifier 524 is controlled by the occurrence of subsequent object events.

These subsequent object events, depending on the applied context of the temporal event signifier 524, include object events specific to and occurring within the given group, or object events across all users indicated by the immutable cryptographic ledger. For example, a temporal event signifier 524 indicating progress towards a floor price increase (e.g., those illustrated in FIG. 5G) is controlled by group-agnostic events. Indeed, any purchase of floor-price objects, whether or not by a group member, impacts the progress towards a floor price increase.

As another example, a temporal event signifier 524 indicating completion towards group participation in an object collection is controlled only by group-specific events. As such, the platform updates the temporal event signifier 524 only in response to object events related to group members.

FIG. 5G additionally illustrates a completion event signifier 526 that is presented upon occurrence of the object event forecasted by a temporal event signifier 524. In the illustrated example, the completion event signifier 526 indicates a floor price increase. In the illustrated example, the completion event signifier 526 indicates a level attributed to the collection that relates to the floor price of the object, and the levels are indicative of a relative value of different floor prices. For example, upon the floor price of the Azuki collection rising to 10ETH, a level number 15 would be assigned to the Azuki collection and indicated in the completion event signifier 526.

Accordingly, as demonstrated in FIG. 5G, temporal aspects and collection-specific aspects of object events are indicated via event signifiers in the newsfeed or presentation interface. These event signifiers build anticipation and excitement of users towards a forecasted goal or significant event.

Dynamic Animation of Interrelated Marketplace Assets

Collections of NFTs exemplify groups of interrelated objects or assets. As discussed herein, an NFT collection is defined by one or more NFTs that share and/or are permuted from a base set of attributes or traits. For example, Bored Ape NFTs each have a set of traits that are variations of a base set of traits, and variations in said traits are realized in the respective digital artworks of each NFT of the Bored Ape NFT collection. Other examples of groups or sets of interrelated objects include shoe collections (e.g., different colorways of an Air Jordan shoe model), a limited group of objects (e.g., a set of baseball cards, a line of stamps, a numbered set of signed art prints), and/or the like. In some embodiments, an object set includes objects that share at least one attribute, such as shoes that share a logo or that share a recognizable marking. In some embodiments, an object set is explicitly created and defined based on an artificial constraint on a supply or pool of objects, and the object set thus include "limited edition" objects (e.g., shoes, NFTs, cards). In some embodiments, an object set includes objects that are produced or originate from a common source provider (e.g., a shoe brand, a user that mints cryptographic objects). In some example object sets, each object remains unique and is associated with its respective value, while being associated with other similar objects. Thus, related objects as referred to herein can be understood as near-but non-fungible.

These and other definitions of interrelated objects are contemplated and are applicable to embodiments disclosed herein. In some embodiments, an object set is dynamically defined based on user input that specifies a shared attribute, characteristic, or dimension among objects. In such embodiments, techniques disclosed herein include dynamically identifying related objects for a given object (e.g., according to the user input) to define an object set that includes the given object and the related objects.

Existing object display interfaces lack a balance between indicating individually-specific information for given objects and representing larger-scale information that relates to sets of objects or to similar objects. A need exists to efficiently indicate, for a given object, information specific to the given object, information for related objects, and information specific to the object set to which the given object belongs.

Embodiments disclosed herein relate to dynamic and interconnected animations presented across an object display interface to visually indicate multi-level information, or information pertaining to a given object, related objects, and an object set. In some embodiments, dynamic animations are presented on certain display tiles of a marketplace interface that correspond to objects belonging to a same object set. By these animations, each display tile efficiently provides information having relevance spanning multiple related objects. As an example, an NFT marketplace interface dynamically presents animations on display tiles corresponding to NFTs of a same collection, with the animations on a tile indicating transactions of related NFTs and indicating changes to collection-specific, or aggregate, parameters.

As such, individual display tiles of an interface are improved to provide additional contextual information. Embodiments disclosed herein improve navigational efficiency of users, as users are presented with relevant information quickly and efficiently without needing to turn to other interfaces or sources. Embodiments disclosed herein include both dynamic and persistent indicators such that information is conveyed efficiently and with reduced clutter and confusion.

Figure 6:
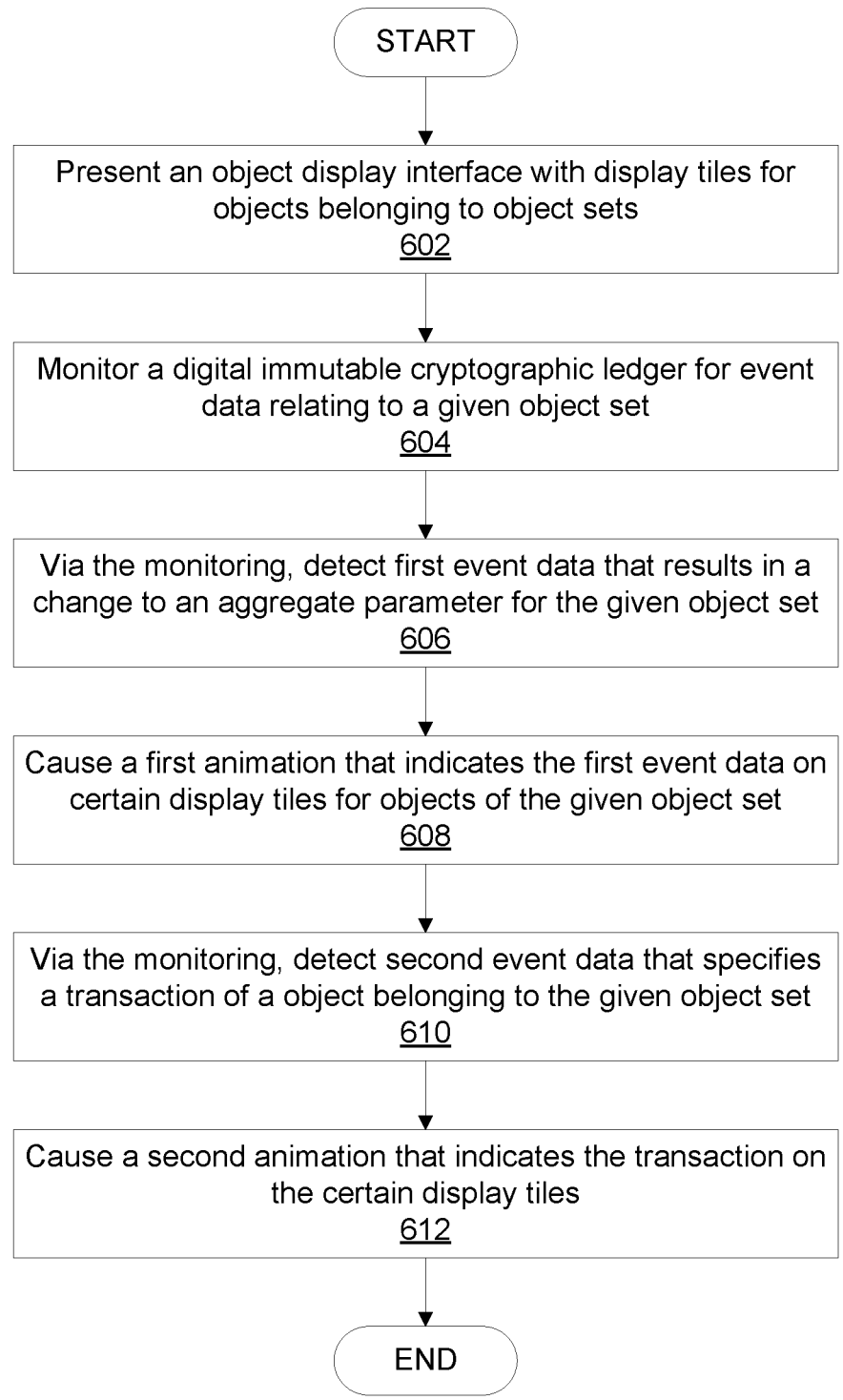
FIG. 6 is a flowchart illustrating example operations for dynamic and interconnected animations for interrelated objects.

FIG. 6 illustrates a flow chart of example operations for presenting dynamic and interconnected animations throughout an object display interface is illustrated. The example operations present an animation at a tile of the object display interface to at least indicate dynamic events relating to related objects and/or an object set. Examples discussed herein are implemented in newsfeed-type interfaces that list pluralities of objects, social-based interfaces that show pluralities of objects, marketplace interfaces that display objects, and/or the like. For example, the operations are performed by a social platform (e.g., the social platform disclosed herein, the group-related event presentation platform disclosed herein), a newsfeed platform, a trading/transaction/marketplace platform, and/or the like.

At an operation 602, a platform presents an object display or presentation interface. The object display interface includes a plurality of display tiles that each correspond to an object. In some embodiments, a display tile includes digital artwork, an image, and/or a depiction or representation of the corresponding object. In an example of a NFT collection or marketplace interface, the display tiles correspond to NFTs that are identified by data stored on a digital immutable cryptographic ledger (e.g., a blockchain), and each NFT belongs to one of one or more NFT collections. The following description refers to an NFT collection or marketplace interface for ease of description; however as described above, the following description is similarly applicable to other object display interfaces that include display tiles for objects, including interrelated objects.

Figure 7A:
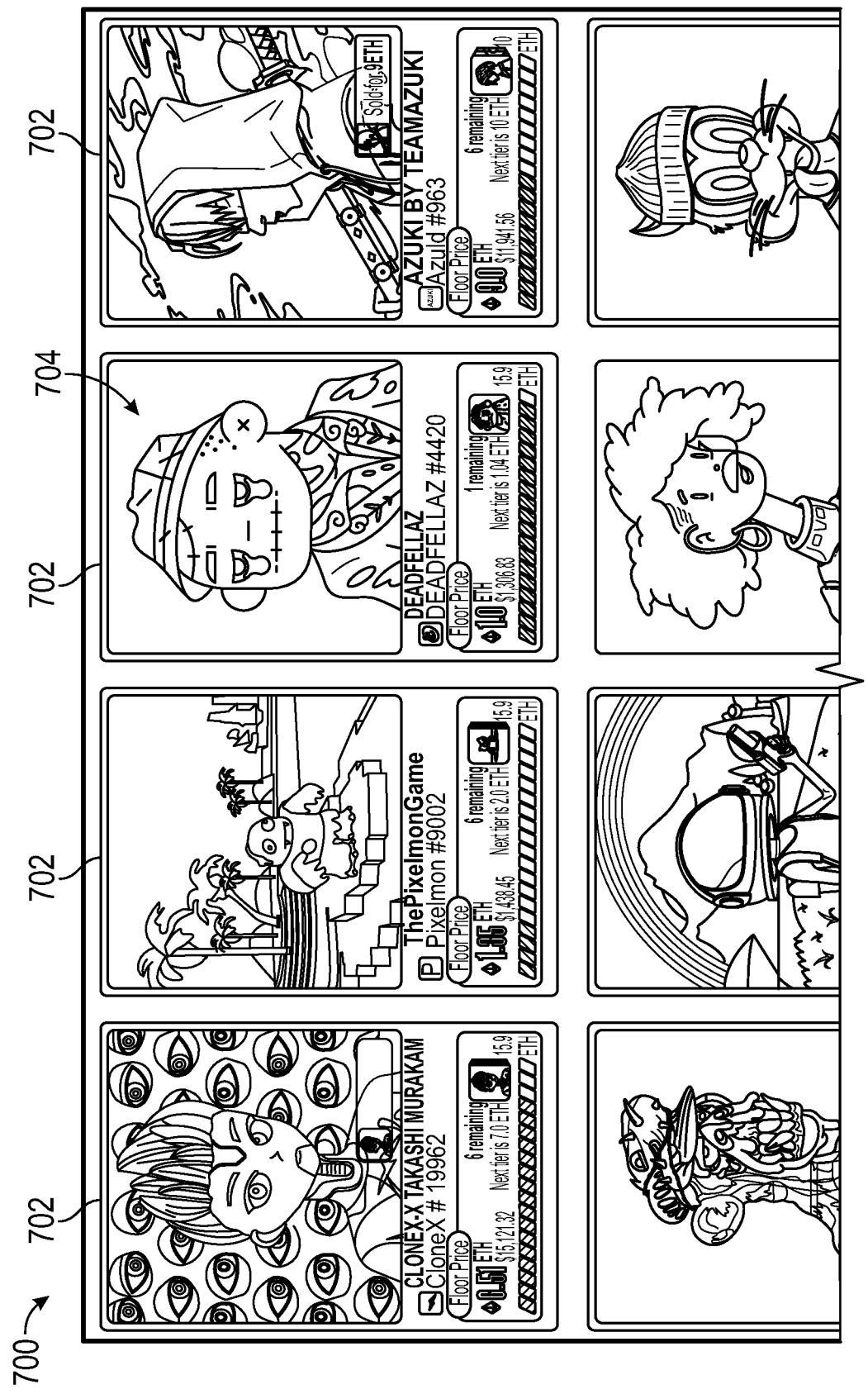
FIG. 7A illustrates an example object display interface including display tiles on which dynamic and interconnected animations are presented.
Figure 7B:
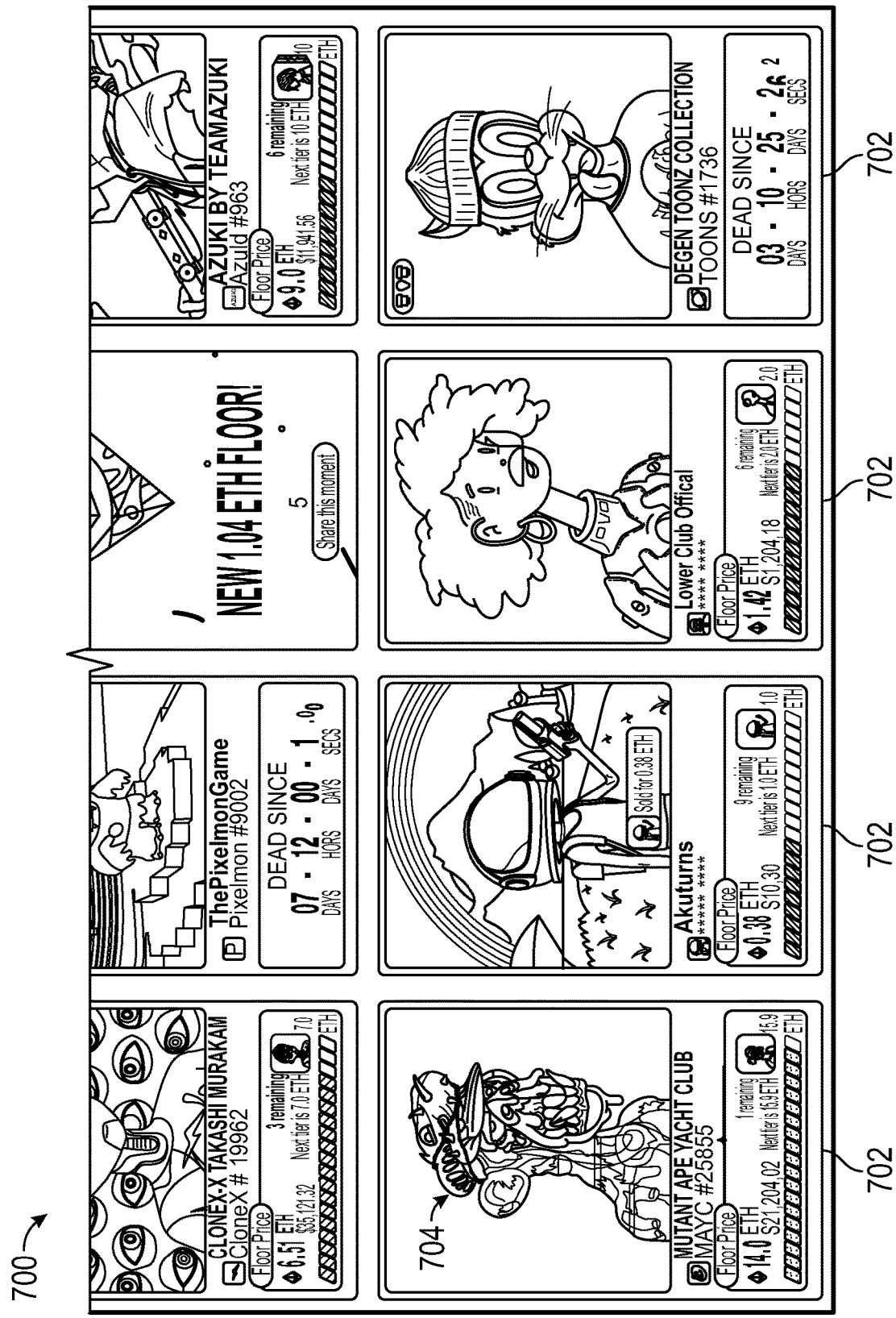
FIG. 7B illustrates an example object display interface including display tiles on which dynamic and interconnected animations are presented.

FIG. 7A and FIG. 7B each illustrate a portion of an object display interface 700 that is presented according to operation 602. As shown, the object display interface 700 includes a plurality of display tiles 702 each corresponding to and representing a cryptographic object (e.g., an NFT). At least some objects corresponding to display tiles 702 of the object display interface 700 belong to object sets. For example, a particular display tile in FIG. 7A corresponds to a cryptographic object labeled Pixelmon #9002, and the interface includes other display tiles corresponding to other cryptographic objects also belonging to a Pixelmon collection (not explicitly illustrated). As shown in FIG. 7A and FIG. 7B, a display tile 702 includes digital artwork 704 associated with the corresponding cryptographic object. In some embodiments, the digital artwork 704 associated with a cryptographic object is obtained using a distributed application of the digital immutable cryptographic ledger, for example a dApp for the collection and/or a dApp that generated and define the cryptographic object.

Returning to FIG. 6, at an operation 604, the platform monitors event data relating to a given object set. For example, the platform monitors event data recorded on the digital immutable cryptographic ledger for the cryptographic objects. In other examples, the platform searches throughout transaction data for the event data.

At an operation 606, the platform detects, based on the monitoring, first event data that results in a change to an aggregate parameter for the given object set. Aggregate parameters refer to parameters that represent and/or characterize the objects belonging to the given object set. An example aggregate parameter is a floor price or minimum value associated with an object belonging to the given object set, thereby approximately and summarily representing an overall or entry value for the given object set. Another example aggregate parameter is an event rate that describes a frequency that objects of the given object set are transacted, traded, created, destroyed, and/or the like. The event rate generally describes an activity level across the given object set. Event rates can be further qualified, including creation or minting rates, purchase rates, listing rates, and/or the like. Further examples of aggregate parameters include a number of objects of the given object set that are currently available on the marketplace, a cumulative value (e.g., in ETH units, in USD units) of available objects of the given object set, a number of objects of the given object set that are above or below certain thresholds as evaluated by other recorded parameters, a number of unique users who are holding and/or have purchased objects of the given object set, ratios of other aggregate parameters, and/or the like. Other aggregate parameters representative of a defined grouping of multiple objects are contemplated and are applicable to embodiments disclosed herein. As will be appreciated, aggregate parameters can relate to analytics for an object set and can be used with machine learning models to classify, characterize, and predict aspects of object sets.

In some embodiments, the platform manages, updates, calculates, and/or the like the aggregate parameters for the given object set locally and/or off-chain (e.g., the aggregate parameters are not stored on the digital immutable cryptographic ledger). In some embodiments, the platform determines the change to an aggregate parameter based on one or more events defined in the first event data. For example, the platform determines an increase in floor price based on detecting event data describing a purchase of a sole remaining object having the floor price, and the platform determines a decrease in floor price based on detecting event data describing a listing of an object having a lower value than the floor price.

At an operation 608, the platform causes, in response to the detection of the first event data, a first animation that indicates the first event data on certain display tiles for objects of the given object set. For example, the platform identifies the certain display tiles as corresponding to objects belonging to the given object set. The first animation across the certain display tiles visually indicates the change to the aggregate parameter for the given object set. In some embodiments, the platform triggers the first animation on the certain display tiles based on the change to the aggregate parameter satisfying a threshold, and/or the updated aggregate parameter satisfying a threshold. For example, based on the change to an event rate for the given object set and/or the event rate itself satisfying a threshold, the platform triggers the first animation.

Figure 8A:
FIG. 8A illustrates an example display tile on which dynamic and interconnected animations are presented according to related objects for the display tile.

FIGS. 8A-8E demonstrate example animations presented in response to changes to aggregate parameters. FIG. 8A first illustrates a display tile 702 with digital artwork 704 for a cryptographic object identified as MAYC #9855. As indicated, the floor price for the MAYC collection (including multiple cryptographic objects including MAYC #9855) is at 15.9 ETH. In response to the platform detecting a purchase of the last cryptographic object having the floor price value, the platform presents the example animation 800A shown in FIG. 8B, indicating the increase in floor price. In particular, the platform presents the example animation 800A on each display tile for a cryptographic object belonging to the MAYC collection. As such, as long as at least one display tile for the MAYC collection is in view for a user, the user obtains contextual and relevant information for the MAYC collection.

Figure 8B:
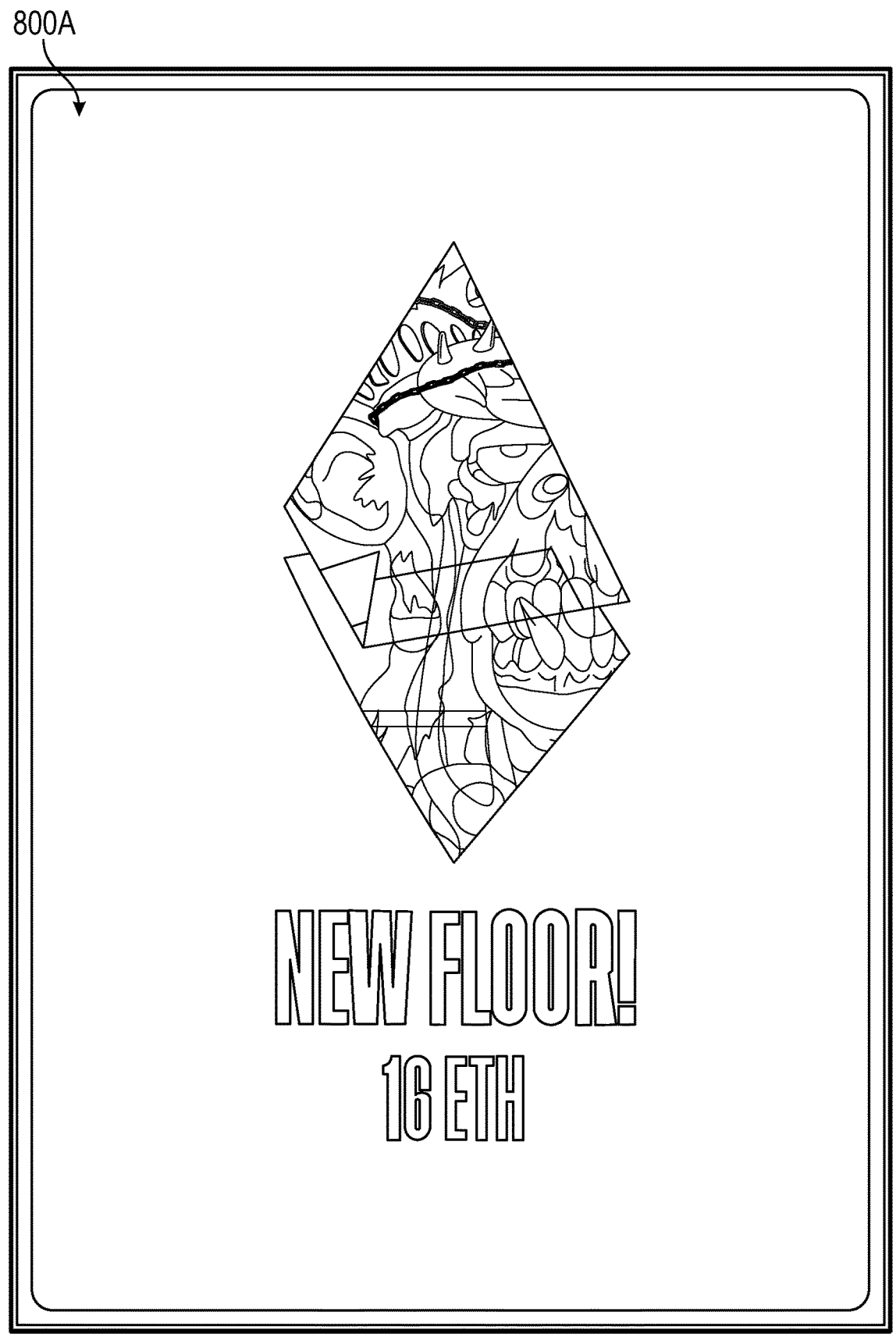
FIG. 8B is a screenshot demonstrating an example animation presented on a display tile in response to an aggregate parameter change.
Figure 8C:
FIG. 8C is a screenshot demonstrating an example animation presented on a display tile in response to an aggregate parameter change.

In a different example scenario, in response to the platform detecting a listing of a cryptographic object (in the MAYC collection) being listed for a value less than the floor price, the platform presents the example animation 800B shown in FIG. 8C, indicating the decrease in floor price. The platform presents the example animation 800B on each display tile relevant to the MAYC collection, for the wide-spanning conveyance of macro-object information.

Figure 8D:
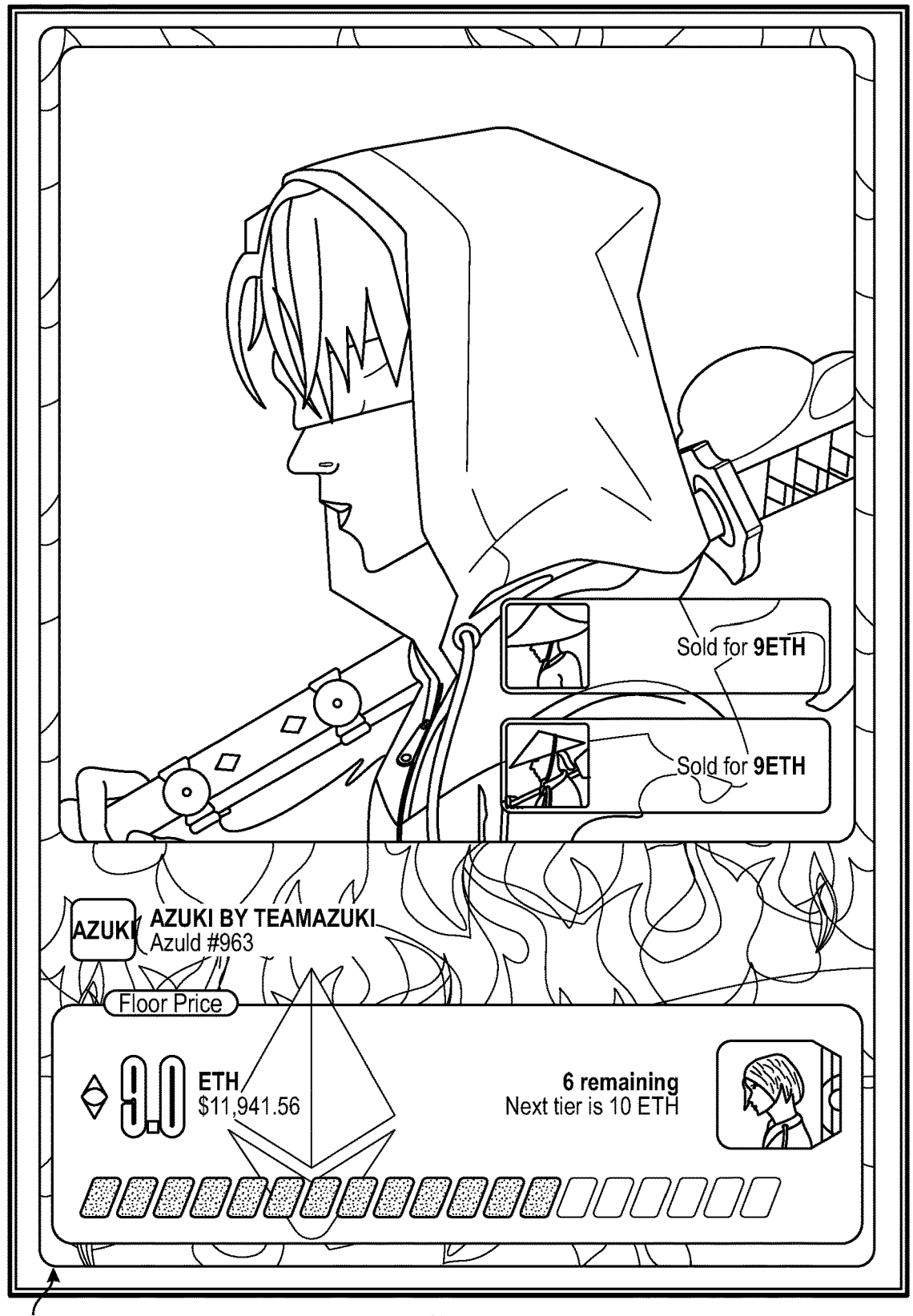
FIG. 8D is a screenshot demonstrating an example animation presented on a display tile in response to an aggregate parameter change.
Figure 8E:
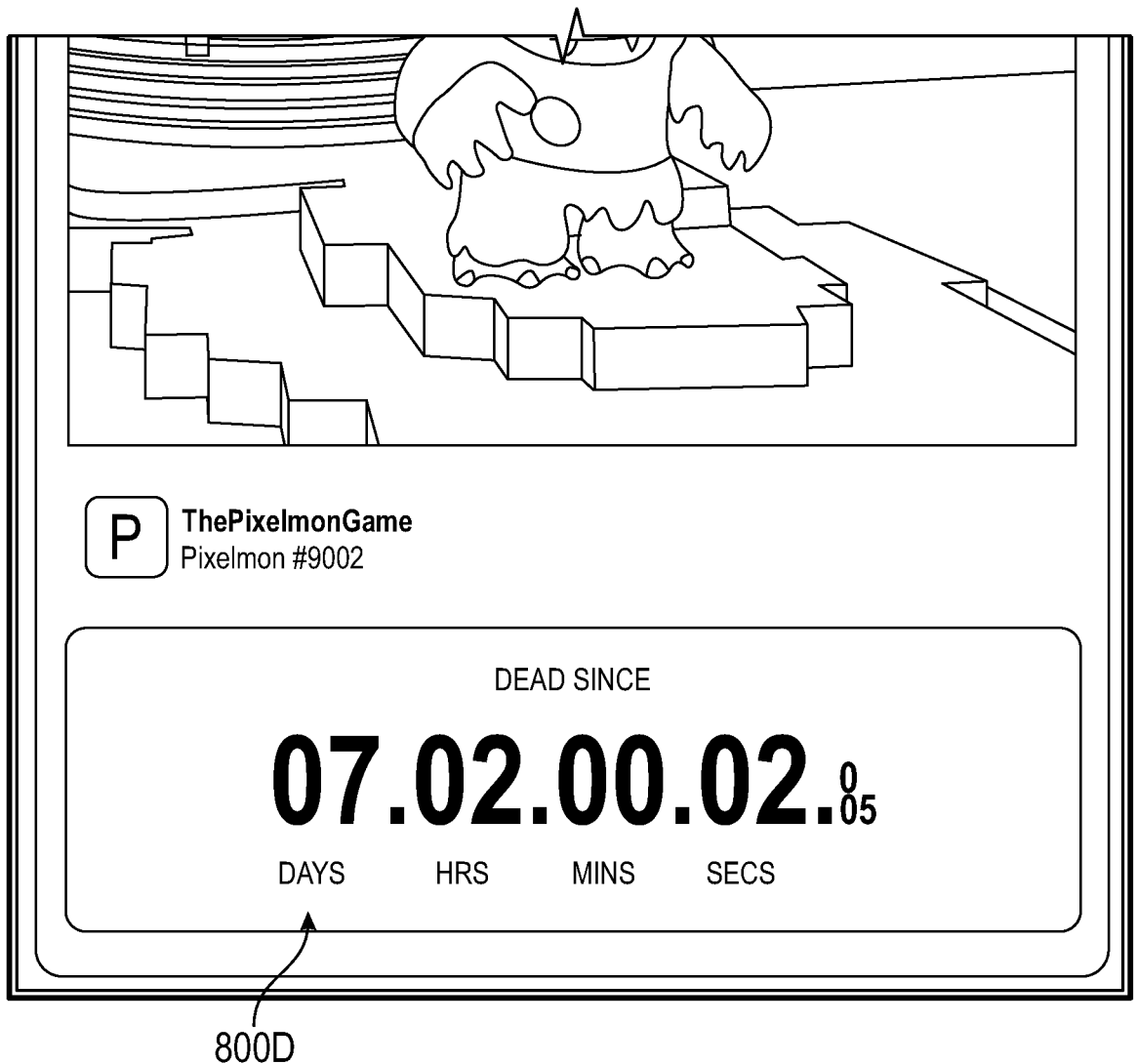
FIG. 8E is a screenshot demonstrating an example animation presented on a display tile in response to an aggregate parameter change.

While FIGS. 8B and 8C demonstrate animations for floor price changes, FIGS. 8D and 8E demonstrate animations for set-wide/spanning event rate changes. Specifically, FIG. 8D demonstrates an example animation 800C that is presented on tiles when the event rate for the given object set significantly increases (e.g., with respect to a threshold). In the illustrated embodiment, the example animation 800C includes rising flames that represent the relatively high activity for the given object set.

FIG. 8E demonstrates an example animation 800D that is presented on tiles when the event rate for the given object set significantly decreases (e.g., with respect to a threshold). The example animation 800D includes a timer that indicates an elapsed time since the platform detected an event (e.g., a purchase, a listing) involving any object belonging to the given object set. In some embodiments, the example animations 800C and 800D are presented until another change (e.g., inverse to the triggering change) to the event rate occurs. For example, the animation 800C is shown until the event rate decreases from its increased state, and the animation 800D is shown until the platform detects a new event involving any object belonging to the given object set.

In some embodiments, a visual size of an animation (e.g., example animations 800A-800D), or the area on the display tile spanned by the animation, is based on the aggregate parameter, a magnitude of the change to the aggregate parameter, or a preset configuration. In an example, the visual size of an animation triggered by a floor price change corresponds to a magnitude of the floor price change. In another example, the visual size of an animation indicating an increased event rate corresponds to one of multiple thresholds that the event rate passed.

Returning to FIG. 6, at an operation 610, the platform detects, based on the monitoring, second event data that specifies one or more transactions of objects belonging to the given object set. In some embodiments, the platform simultaneously monitors (at the operation 604) for both the first event data and the second event data and dynamically detects each of the first event data and the second event data. In some examples, the second event data is the same as the first event data; that is, the transactions specified by the second event data cause the change to the aggregate parameter for the given object set. In some embodiments, the detected second event data specifies discrete events other than purchases, such as listings, exchanges, mintings, and/or the like. In some embodiments, the second event data identifies a user involved in each transaction or event for the objects. For example, the second event data identifies a cryptographic wallet address associated with a purchase, listing, sale, and/or minting of a cryptographic object.

At an operation 612, the platform causes, in response to the detection of the second event data, a second animation that indicates each transaction on the certain display tiles. In some embodiments, the platform presents the second animation on certain display tiles corresponding to objects of the given object set other than the objects specified in the second event data. That is, the platform presents the second animation on a display tile to which a specified object is relevant, but the platform does not present the second animation on the display tile for the specified object itself, in some examples.

In some embodiments, due to a potential high volume of transactions detected for a voluminous object set, the second animation is presented at a predetermined location within a given display tile intended to minimize distraction from the object corresponding to the given display tile while sufficiently conveying the information. In some embodiments, a visual size of the second animation on each of the certain display tiles is smaller than a visual size of the first animation presented according to set-wide/spanning aggregate parameter changes. In some embodiments, a size of the second animation is scaled based on a volume of transactions. For example, for a large wave of detected transactions, the second animation indicating each transaction is scaled to be smaller to not cause visual clutter and obstruct the digital artwork of the display tile.

As discussed above, in some examples, transactions or events specified by the second event data lead to the change in an aggregate parameter, and the second animation and the first animation are presented simultaneously. In some embodiments, based on the second animation and the first animation being triggered within a predetermined time window of one another (e.g., two hundred milliseconds to five seconds, five hundred milliseconds to three seconds, one second to two seconds), the platform presents only the first animation on the display tile.

Figure 9A:
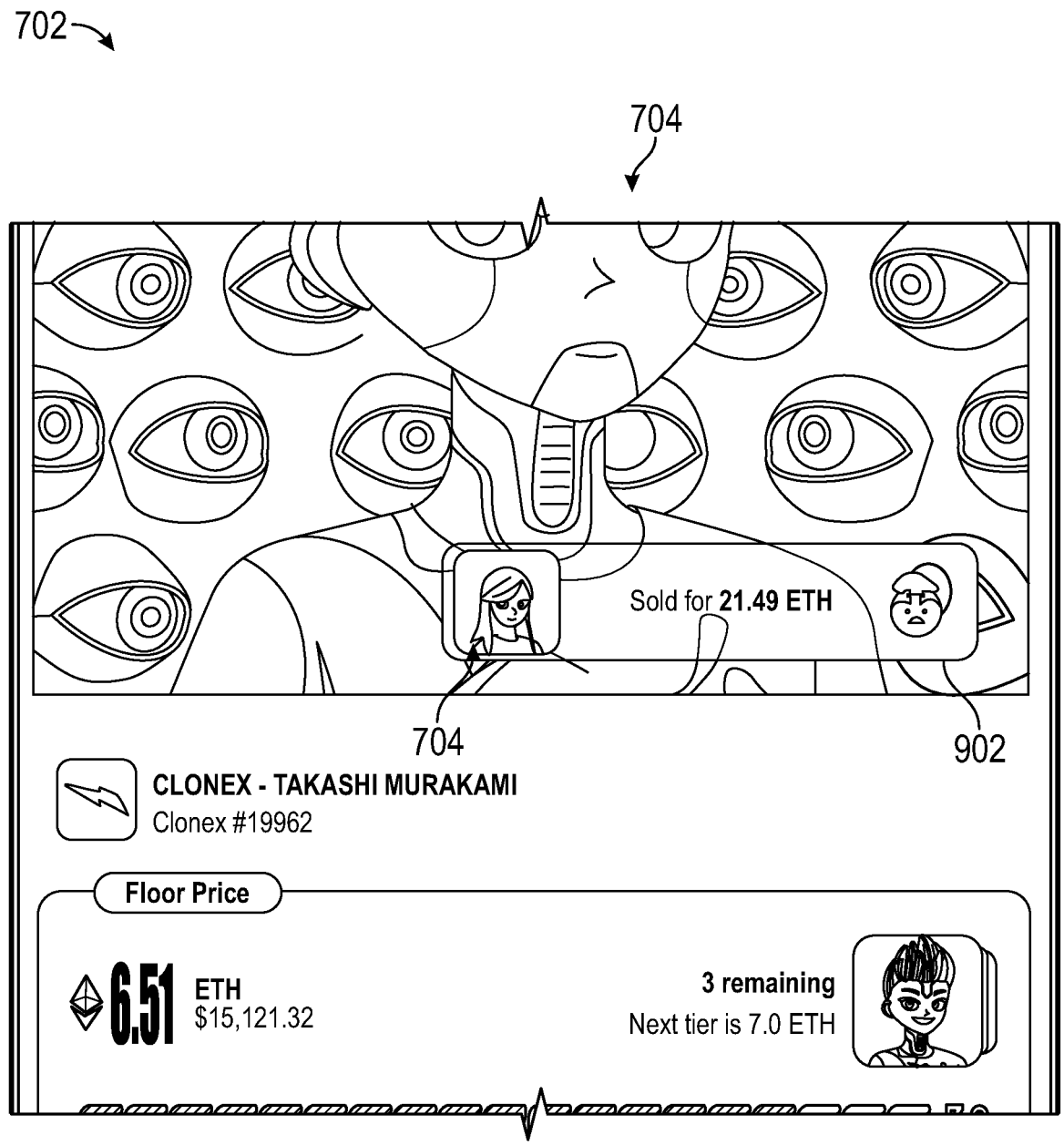
FIG. 9A is a screenshot demonstrating an example animation presented on a display tile in response to an event for a related object corresponding to a different display tile.

FIG. 9A shows an example animation 902 presented on a display tile 702 to visually indicate an individual transaction for a related object. As shown, the animation 902 is presented on a predetermined location on the display tile 702 that is expected to not significantly obstruct the digital artwork 704 of the corresponding object. In some embodiments, animations 902 for individual transactions or events span a smaller area on the tile compared to animations for aggregate parameter changes (e.g., example animations 800A-800D). In some embodiment, animations triggered by individual events includes information related to the related object and/or to the individual events themselves. In the illustrated example, the animation 902 includes digital artwork 704 for the related object and a value of the related object (5.49 ETH). Thus, with animations 902 for each event for related objects, a user viewing the display tile 702 is informed of dynamic events occurring with similar related objects. A user, knowing the value at which related objects are being sold via the animation 902, is able to apply the conveyed information to make improved decisions related to the object corresponding to the display tile 702 itself.

Figure 9B:
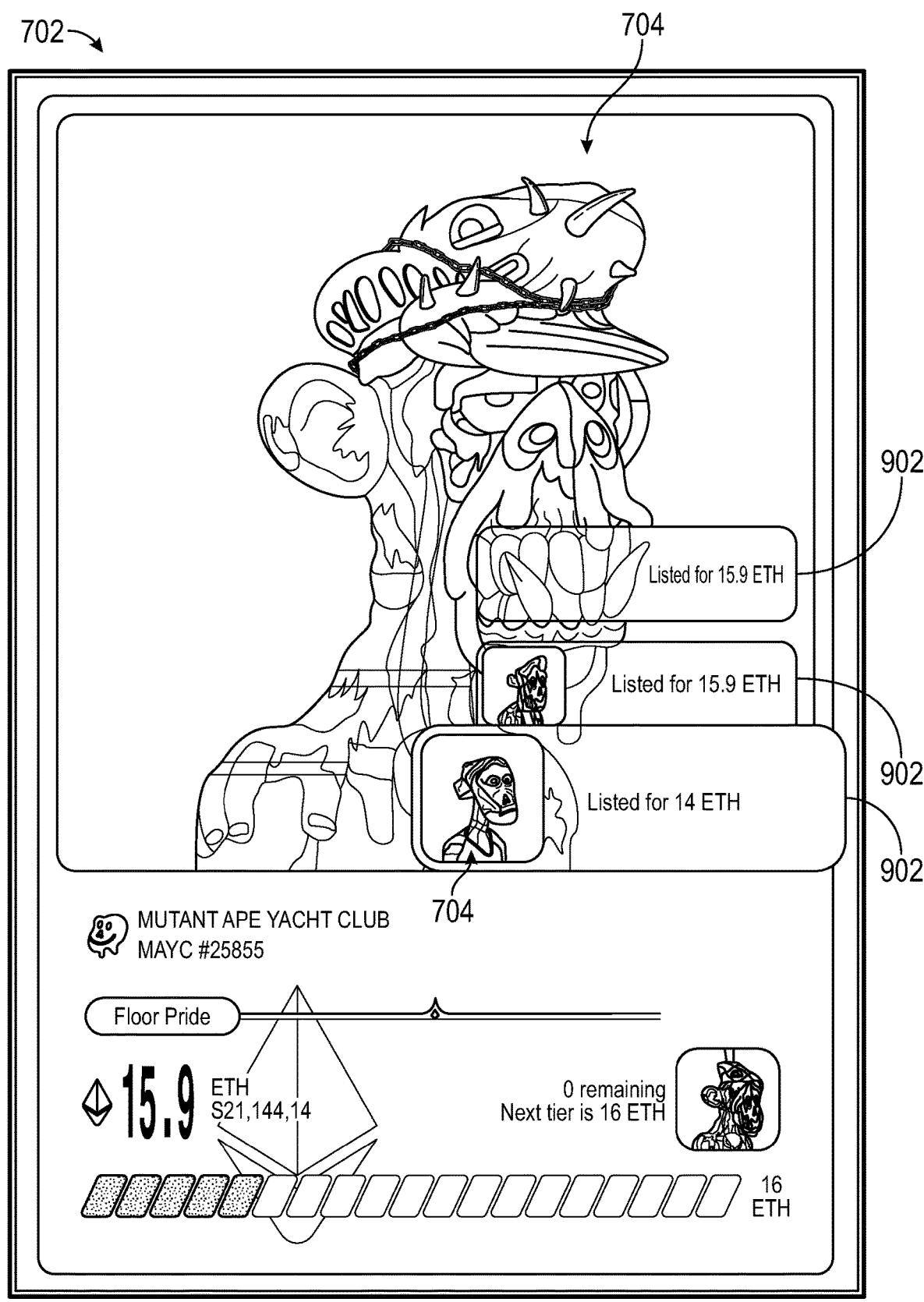
FIG. 9B is a screenshot demonstrating an example animation presented on a display tile in response to an event for a related object corresponding to a different display tile.

FIG. 9B provides another example demonstration of animations 902 being presented on a display tile 702 to visually indicate events for related objects. In the illustrated example of FIG. 9B, multiple of animation 902 are presented in accordance with multiple events for related objects occurring dynamically. Each animation 902 identifies (e.g., by including the digital artwork 704, by including an object identifier) the related object.

As discussed, individual events indicated by the animations 902 cause changes to aggregate parameters, in some instances. For example, in FIG. 9B, an animation 902 indicates that a related object was listed for 14 ETH, while the display tile 702 indicates that the floor price of the object set is 15.9 ETH. Thus, the listing results in the floor price being lowered, and the platform presents the animation 800B shown in FIG. 8C responsively, in some embodiments.

Dynamic and interconnected presentation of visual animations based on related objects has been discussed. According to example embodiments, display tiles 702 included in an object display interface include further features that enable user interaction with the related objects. In some examples, the object display interface is a marketplace interface, and each display tile 702 includes an interactable feature that, in response to user interaction, initiates an event (e.g., a purchase, an exchange, a transaction) with the object corresponding to the display tile 702. In some embodiments, a display tile 702 includes further interactable features that enable events for related objects.

Figure 10A:
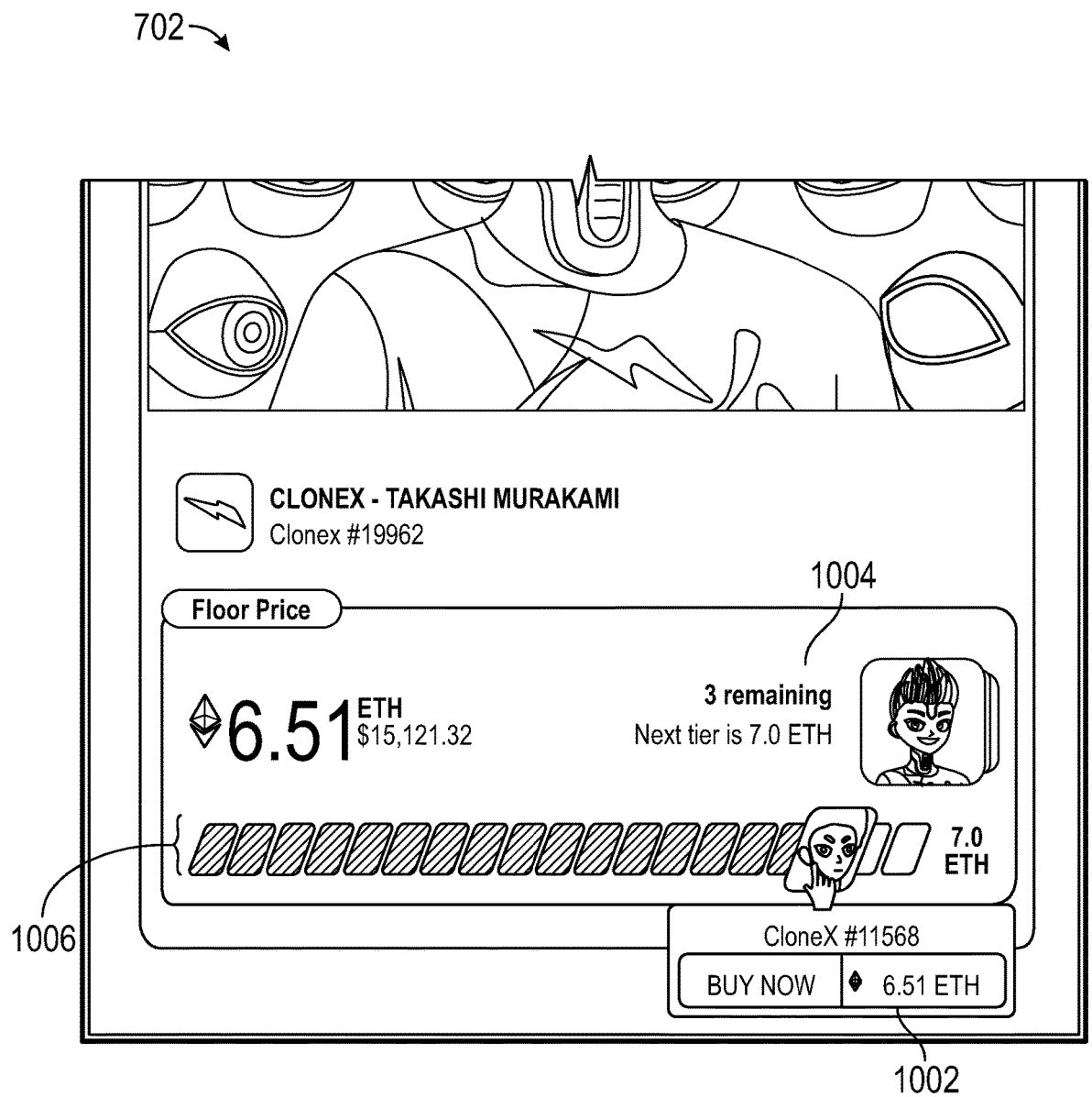
FIG. 10A illustrates an example display tile feature that is associated with other objects related to a display tile.
Figure 10B:
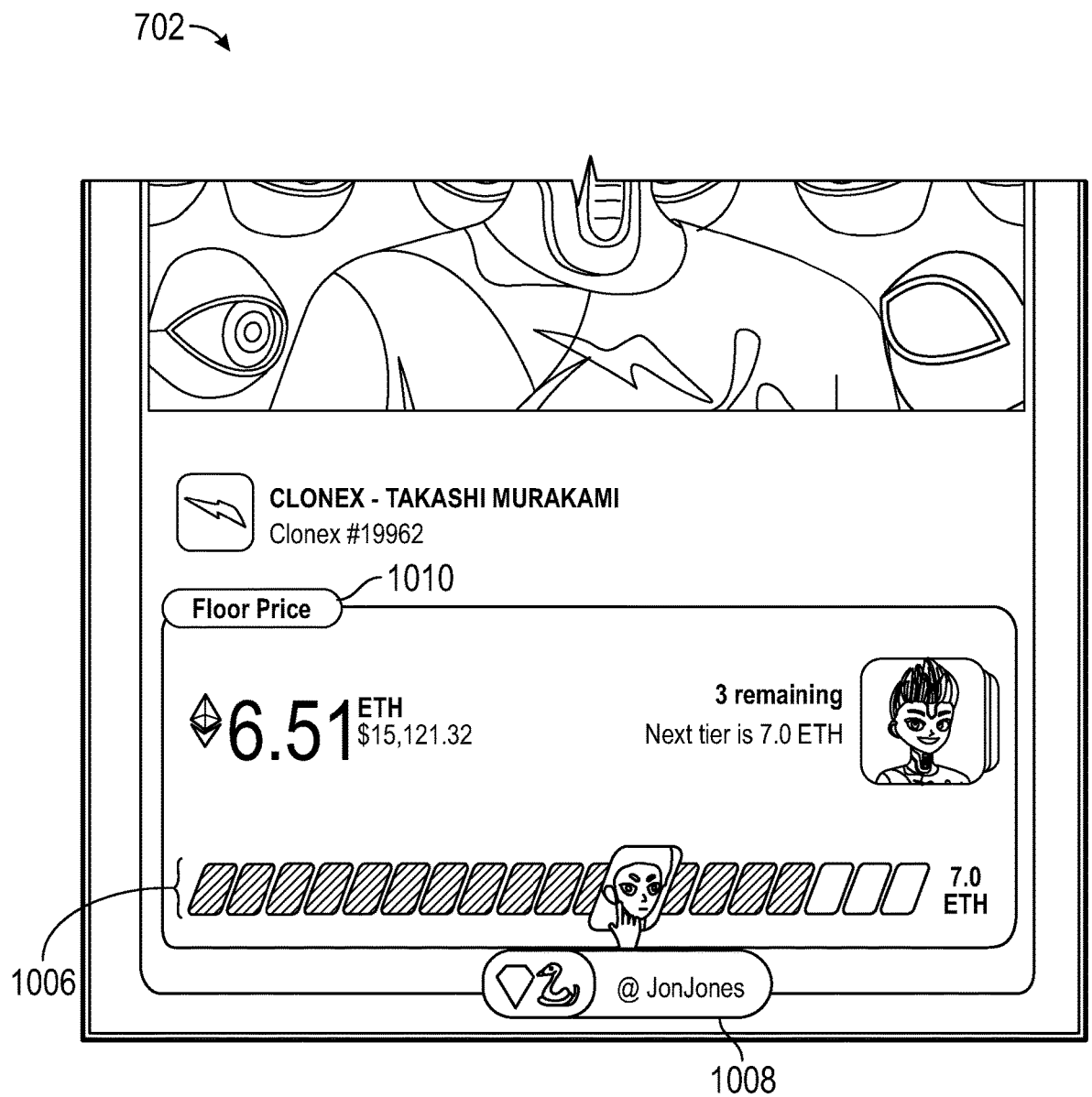
FIG. 10B illustrates an example display tile feature that is associated with other objects related to a display tile.

For example, FIG. 10A illustrates a display tile 702 that allows a user to purchase a related object via an interactable feature 1002. In some embodiments, the display tile 702 includes a persistent indication or reference to related objects. In the illustrated example, the display tile 702 includes a progress bar 1006 whose units represent objects in the object set having the floor price, and the display tile 702 indicates a remainder 1004 of floor price objects still available. The progress bar 1006 as illustrated then represents a progress towards an increase in floor price, and interaction with the progress bar 1006 enables users to purchase floor price objects, thereby encouraging the increase in floor price. While a first interaction with the progress bar 1006 enables purchase of available floor price objects, another interaction with the progress bar 1006 enables users to view an owner 1008 of unavailable floor price objects, as shown in FIG. 10B. In some embodiments, the display tile 702 includes an indication 1010 (e.g., a persistent indication, a dynamic or animated indication) that the corresponding object is valued at the floor price.

Figure 10C:
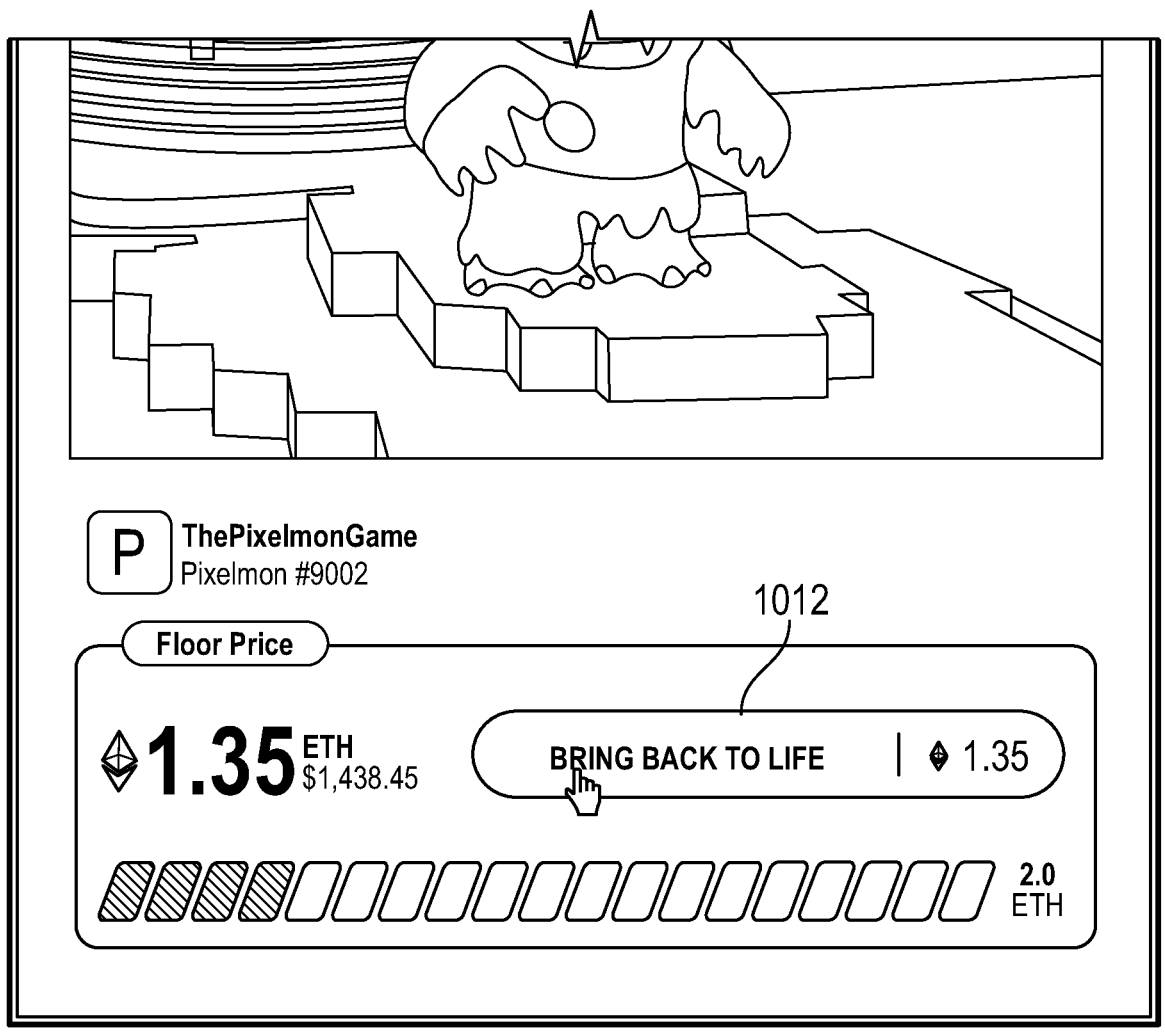
FIG. 10C illustrates an example interactable feature provided by a display tile of an object display interface.

FIG. 10C illustrates another example of an interactable feature 1012 enabling users to initiate an event with an object. Specifically, the interactable feature 1012 of the display tile 702 enables a user to purchase the object corresponding to the display tile 702. In the illustrated example, the interactable feature 1012 is presented on the display tile 702 in accordance with the event rate of the object set being below a threshold. For example, the interactable feature 1012 is presented in connection with the example animation 800D shown in FIG. 8E. That is, in some embodiments, a display tile includes different interactable features that enable events with corresponding objects depending on a current state of aggregate parameters.

According to embodiments disclosed herein, object display interfaces include dynamic presentation of interconnection animations that indicate macro-object information. Neat and efficient visualization of multi-faceted and contextual information is then provided and is enjoyed in different settings for display of objects such as NFTs, limited edition objects, numbered objects/collectibles, and/or the like. Referring back to FIGS. 7A and 7B, animations are dynamically presented, and different animations can be presented on different tiles according to the specific events occurring for the corresponding object sets. Embodiments disclosed herein that involve aggregation of and animation for set-wide parameters enables improved navigational efficiency for users, as well as enhance interface operations such as sorting display tiles by floor price, event rate, and/or individual value.

Interrelation of Digital Objects

In some embodiments digital objects interrelate and have functionality with one another. Described below are a number of embodiments of interrelation:

A) a first digital object is enabled to generate further derivative digital objects. The derivative digital objects may be distributed at will, but if the first digital object changes possession, all derivative digital objects deactivate. For purposes of this disclosure and other examples, the term "Deactivate" refers to any of: losing all functionality, losing any user decipherable representation, and/or being deleted. Various embodiments implement deactivation either through internal programing of the digital object, or as conditions within a smart contract the digital object is associated with. A user decipherable representation refers to visual representations or data that is intended to be read by humans (e.g., not hash values). Examples include identity data that identifies the owner of the digital object.

B) a first digital object is an NFT and is associated with a cryptographic wallet. Contents of the cryptographic wallet are used as the input used to generate the first digital object. Where any of the original input are transferred away from the cryptographic wallet, the first digital object is deactivated.

C) a first digital object is an NFT and is associated with a cryptographic wallet. Contents of the cryptographic wallet are used as the input used to generate the first digital object. Where the first digital object is transferred away from the cryptographic wallet, the first digital object is deactivated.

D) a first digital object is an NFT and is associated with a cryptographic wallet. Contents of the cryptographic wallet are used as the input used to generate the first digital object. Where the content of the cryptographic wallet changes, data associated with the digital object also changes. For example, where a new NFT is added to the cryptographic wallet, a visual representation of the digital object is updated to include reference to or elements of the new NFT that has been added. The update to the digital object enables the digital object to evolve as changes occur to the cryptographic wallet.

In some embodiments of the evolving digital object, the digital object generation platform is executed subsequent times to modify the original digital object. The input scheme of evolving digital objects accommodates multiple schema. For example, in some embodiments, the visual representation of the digital object is remade from the current existing input (e.g., deleted and re-created). In other embodiments, the existing visual representation is used as a base element that is modified or embellished based on the changes to the cryptographic wallet. Where the existing visual representation is used as a base element, additional weight is given to the existing visual representation in the machine learning models such that the output remains recognizable as having originated from the base element.

In each of the examples above, some alternate embodiments replace deactivation with a broader modification. For example, some or part of the human decipherable content is deleted or changed. Where the digital object carried identity information, the visual representation may remain, but the identity portion may be deleted or updated to a new owner.

Where the digital object is an NFT that is modified, the changes to the NFT occur in the smart contract from which the NFT is associated. Changes to the visual representation or other data associated with the NFT are based on how the smart contract encodes cryptographic data of the NFT to human decipherable components. Where human decipherable elements are modified, no change need by made to cryptographic elements of the NFT. Where cryptographic elements of the NFT are changed, those changes are based upon conditions precedent within the smart contract (e.g., a process for revocation of a cryptographic token).

Computing Platform

Figure 11:
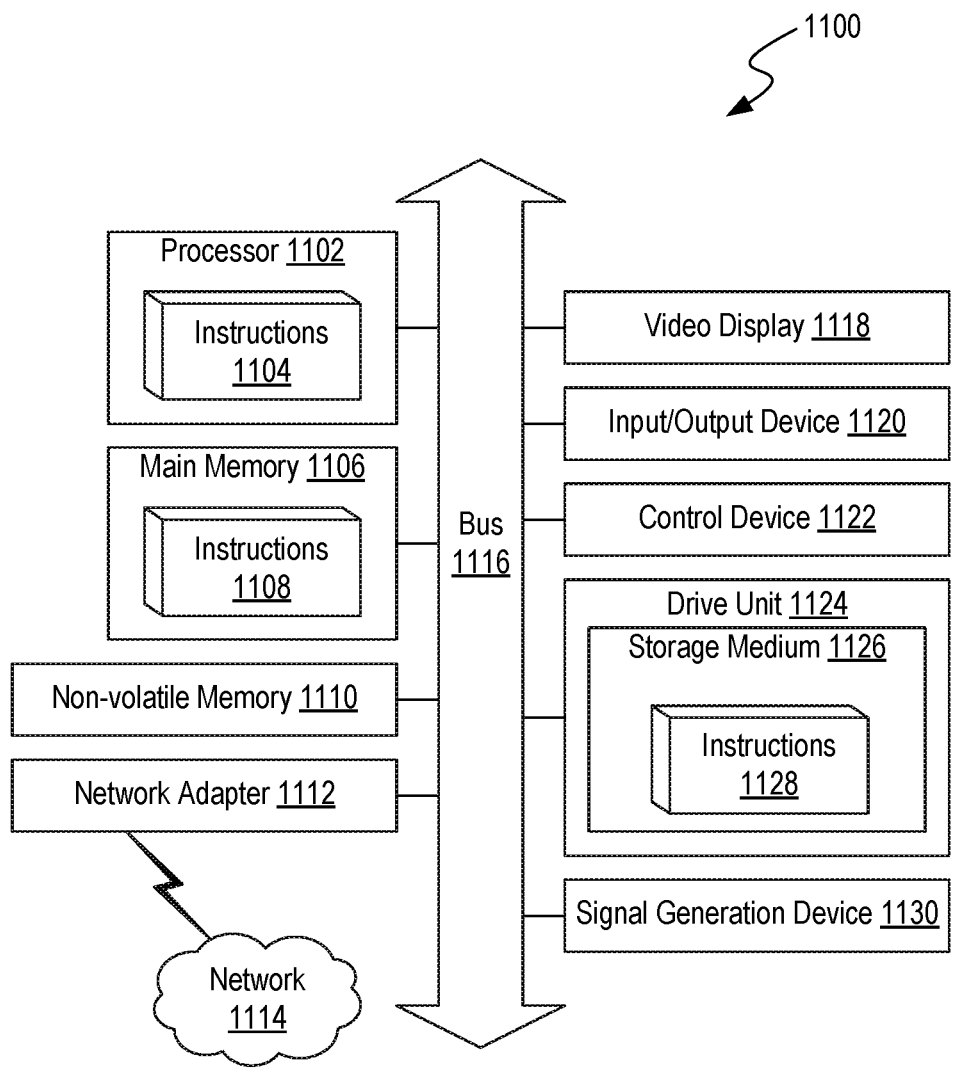
FIG. 11 is a block diagram of an exemplary computing system.

FIG. 11 is a block diagram illustrating an example computer system 1100, in accordance with one or more embodiments. In some embodiments, components of the example computer system 1100 are used to implement the software platforms described herein. At least some operations described herein can be implemented on the computer system 1100.

The computer system 1100 can include one or more central processing units ("processors" 1102), main memory 1106, non-volatile memory 1110, network adapters 1112 (e.g., network interface), video displays 1118, input/output devices 1120, control devices 1122 (e.g., keyboard and pointing devices), drive units 1124 including a storage medium 1126, and a signal generation device 1130 that are communicatively connected to a bus 1116. The bus 1116 is illustrated as an abstraction that represents one or more physical buses and/or point-to-point connections that are connected by appropriate bridges, adapters, or controllers. The bus 1116, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1100 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1100.

While the main memory 1106, non-volatile memory 1110, and storage medium 1126 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1128. The term "machine-readable medium" and "storage medium" shall also be taken to include any medium that is capable of storing, encoding, or carrying a set of instructions for execution by the computer system 1100. In some embodiments, the non-volatile memory 1110 or the storage medium 1126 is a non-transitory, computer-readable storage medium storing computer instructions, which can be executed by the one or more central processing units ("processors") 1102 to perform functions of the embodiments disclosed herein.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1104, 1108, 1128) set at various times in various memory and storage devices in a computer device. When read and executed by the one or more processors 1102, the instruction(s) cause the computer system 1100 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1112 enables the computer system 1100 to mediate data in a network 1114 with an entity that is external to the computer system 1100 through any communication protocol supported by the computer system 1100 and the external entity. The network adapter 1112 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1112 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example ML system 1200 illustrated and described in more detail with reference to FIG. 12.

Machine Learning System

Figure 12:
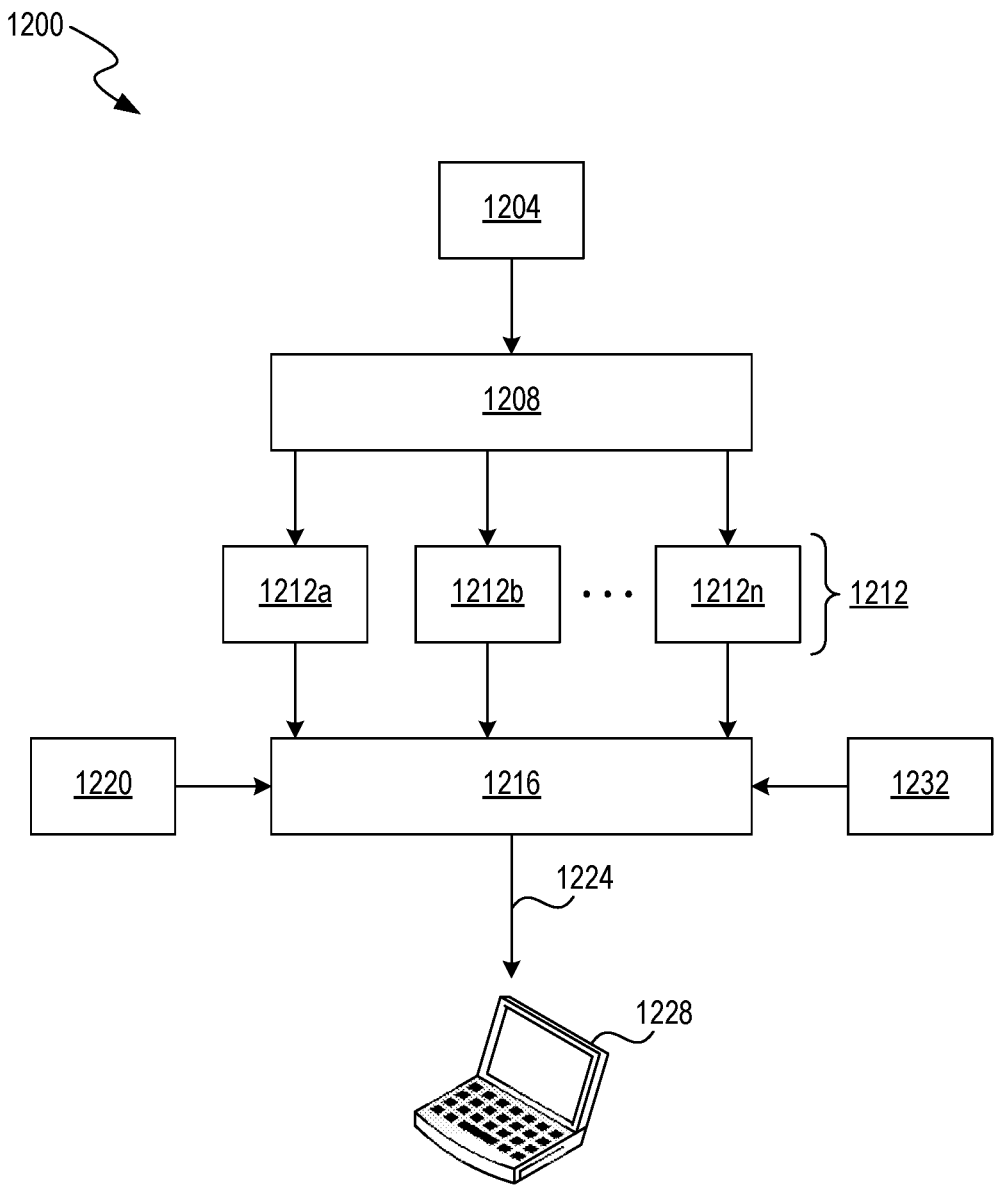
FIG. 12 is a block diagram illustrating an example machine learning (ML) system, in accordance with one or more embodiments

FIG. 12 is a block diagram illustrating an example ML system 1200, in accordance with one or more embodiments. The ML system 1200 is implemented using components of the example computer system 1100 illustrated and described in more detail with reference to FIG. 11. Likewise, embodiments of the ML system 1200 can include different and/or additional components or be connected in different ways. The ML system 1200 is sometimes referred to as a ML module.

The ML system 1200 includes a feature extraction module 1208 implemented using components of the example computer system 1100 illustrated and described in more detail with reference to FIG. 11. In some embodiments, the feature extraction module 1208 extracts a feature vector 1212 from input data 1204. For example, the input data 1204 can include one or more images, sets of text, audio files, or video files. The feature vector 1212 includes features 1212*a*, 1212*b*, . . . 1212*n*. The feature extraction module 1208 reduces the redundancy in the input data 1204, e.g., repetitive data values, to transform the input data 1204 into the reduced set of features, e.g., features 1212*a*, 1212*b*, . . . 1212*n*. The feature vector 1212 contains the relevant information from the input data 1204, such that events or data value thresholds of interest can be identified by the ML model 1216 by using this reduced representation. In some example embodiments, dimensionality reduction techniques, such as principal component analysis (PCA) or autoencoders are used by the feature extraction module 1208.

In alternate embodiments, the ML model 1216 performs deep learning (also known as deep structured learning or hierarchical learning) directly on the input data 1204 to learn data representations, as opposed to using task-specific algorithms. In deep learning, no explicit feature extraction is performed; the features are implicitly extracted by the ML system 1200. For example, the ML model 1216 can use a cascade of multiple layers of nonlinear processing units for implicit feature extraction and transformation. Each successive layer uses the output from the previous layer as input. The ML model 1216 can learn in supervised (e.g., classification) and/or unsupervised (e.g., pattern analysis) modes. The ML model 1216 can learn multiple levels of representations that correspond to different levels of abstraction, wherein the different levels form a hierarchy of concepts. In this manner, the ML model 1216 can be configured to differentiate features of interest from background features.

In alternative example embodiments, the ML model 1216, e.g., in the form of a CNN generates the output 1224, without the need for feature extraction, directly from the input data 1204. The output 1224 is provided to the computer device 1228. The computer device 1228 is a server, computer, tablet, smartphone, smart speaker, etc., implemented using components of the example computer system 1100 illustrated and described in more detail with reference to FIG. 11. In some embodiments, the steps performed by the ML system 1200 are stored in memory on the computer device 1228 for execution. In other embodiments, the output 1224 is displayed on high-definition monitors.

A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 1216 can be a CNN that includes both convolutional layers and max pooling layers. The architecture of the ML model 1216 can be "fully convolutional," which means that variable sized sensor data vectors can be fed into it. For all convolutional layers, the ML model 1216 can specify a kernel size, a stride of the convolution, and an amount of zero padding applied to the input of that layer. For the pooling layers, the ML model 1216 can specify the kernel size and stride of the pooling.

In some embodiments, the ML system 1200 trains the ML model 1216, based on the training data 1220, to correlate the feature vector 1212 to expected outputs in the training data 1220. As part of the training of the ML model 1216, the ML system 1200 forms a training set of features and training labels by identifying a positive training set of features that have been determined to have a desired property in question and a negative training set of features that lack the property in question. The ML system 1200 applies ML techniques to train the ML model 1216, that when applied to the feature vector 1212, outputs indications of whether the feature vector 1212 has an associated desired property or properties.

The ML system 1200 can use supervised ML to train the ML model 1216, with features from the training sets serving as the inputs. In some embodiments, different ML techniques, such as support vector machine (SVM), regression, naïve Bayes, random forests, neural networks, etc., are used. In some example embodiments, a validation set 1232 is formed of additional features, other than those in the training data 1220, which have already been determined to have or to lack the property in question. The ML system 1200 applies the trained ML model to the features of the validation set 1232 to quantify the accuracy of the ML model 1216. In some embodiments, the ML system 1200 iteratively re-trains the ML model 1216 until the occurrence of a stopping condition, such as the accuracy measurement indication that the ML model 1216 is sufficiently accurate, or a number of training rounds having taken place.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for dynamic and selective animation of interface portions, the method comprising:
   presenting an object display interface that includes a plurality of display tiles, wherein each display tile includes digital artwork that is associated with a cryptographic object that (i) corresponds to the display tile, (ii) is identified by data stored on a digital immutable cryptographic ledger, and (iii) belongs to one of one or more object sets;
   for a given object set, monitoring the digital immutable cryptographic ledger for event data that identifies a given cryptographic object of the given object set;
   based on the monitoring, detecting the event data;
   determining that the event data causes a modification to the given cryptographic object of the given object set that results in a change to a set-level parameter that is representative of the given object set as a whole; and
   causing an animation on a first display tile for a first cryptographic object that belongs to the given object set, wherein the animation on the first display tile visually indicates the change to the set-level parameter of the given object set and spans a predetermined area of the first display tile based on a magnitude of the change to the set-level parameter of the given object set.

2. The method of claim 1, further comprising:
   further based on the monitoring, detecting a second event data that specifies a transaction of a second cryptographic object that belongs to the given object set; and
   in response to detecting the second event data, causing a second animation on the first display tile associated with the first cryptographic object, wherein the second animation visually indicates the transaction of the second cryptographic object.

3. The method of claim 2, wherein the second animation spans an area on the first display tile that is smaller than the predetermined area that is spanned by the animation that visually indicates the change to the set-level parameter.

4. The method of claim 1, wherein presenting the object display interface comprises:
   obtaining, for the first display tile, the digital artwork associated with the first cryptographic object via a distributed application associated with the given object set.

5. The method of claim 1, wherein a certain display tile of the object display interface persistently indicates a number of cryptographic objects that (i) belong to the given object set, and (ii) are associated with a minimum value with respect to other cryptographic objects within the given object set.

6. The method of claim 1, wherein the set-level parameter is one of (i) a minimum value associated with a given cryptographic object that belongs to a respective object set, or (ii) an event rate that is based on a number of times that cryptographic objects that belong to the respective object set are identified in the digital immutable cryptographic ledger.

7. A system comprising:
   a processor; and
   a memory storing instructions that, when executed by the processor, cause the system to:
     present an object display interface that includes display tiles each corresponding to a cryptographic object that (i) is identified on a digital immutable cryptographic ledger, and (ii) belongs to one of one or more object sets;
     monitor, for a given object set, the digital immutable cryptographic ledger for at least one of: a first event data that results in a change to a set-level parameter that is representative of the given object set as a whole, or a second event data that specifies a transaction for a given cryptographic object that belongs to the given object set; and
     based on detecting the at least one of the first event data or the second event data, selectively present an animation for each of the at least one of the first event data or the second event, wherein the animation is selectively presented on each display tile displayed in the object display interface that corresponds to a cryptographic object belonging to the given object set.

8. The system of claim 7, wherein the set-level parameter is a minimum value associated with the given cryptographic object that belongs to a respective object set.

9. The system of claim 7, wherein a display tile of the object display interface includes digital artwork for a corresponding cryptographic object that is obtained from a distributed application that generated the corresponding cryptographic object.

10. The system of claim 7, wherein a certain display tile persistently indicates a number of certain cryptographic objects that have a minimum value within the given object set.

11. The system of claim 7, wherein a certain display tile includes a timer that indicates an elapsed time since a detection of event data that relates to a corresponding cryptographic object.

12. The system of claim 7, wherein each display tile included in the object display interface includes an interactable feature that is configured to, in response to user interaction, initiate a transaction event for a corresponding cryptographic object.

13. The system of claim 7, wherein the display tiles included in the object display interface are sorted with respect to a value associated with corresponding on-chain digital assets.

14. A method for interconnected presentation of related objects, the method comprising:
    identifying, for a given object indicated by a given display tile of a presentation interface, one or more related objects, wherein each of the given object and the one or more related objects have a unique combination of attributes that is permuted from a same base set of attributes, wherein the related objects are indicated by corresponding display tiles of the presentation interface;
    during presentation of the presentation interface, searching transaction data for events for the one or more related objects;
    detecting a particular event for a particular related object that results in a change to a set-level parameter that characterizes a set that includes the given object and the one or more related objects; and
    in response to detecting the particular event, causing an animation at a predetermined location within the given display tile based on the particular event, wherein the animation visually indicates the particular event for the particular related object.

15. The method of claim 14, wherein the animation spans an area of the given display tile that corresponds to a magnitude of the change to the set-level parameter that characterizes the set.

16. The method of claim 14, further comprising:
    determining that the given object is associated with a minimum value with respect to values associated with the one or more related objects; and
    including an indication in the given display tile that indicates the given object being associated with the minimum value.

17. The method of claim 14, wherein the given display tile for the given object includes one or more interactable features that each enable a user to initiate a transaction event for a relate object related to the given object.

18. The method of claim 14, wherein the predetermined location within the given display tile is located in a tile portion that includes an interactable feature that initiates a transaction event for the given object.

19. The method of claim 14, wherein the given object is a cryptographic object that is specified on a digital immutable cryptographic ledger, and wherein the one or more related objects belong to an object set to which the given object belongs.

* * * * *